US012624593B2

(12) United States Patent

Chen et al.

(10) Patent No.: US 12,624,593 B2
(45) Date of Patent: May 12, 2026

(54) MOTORIZED VENETIAN BLIND

(71) Applicant: Nien Made Enterprise Co., Ltd., Taichung City (TW)

(72) Inventors: Lin Chen, Taichung City (TW); Jian Zeng, Taichung City (TW)

(73) Assignee: Nien Made Enterprise Co., Ltd., Taichung City (TW)

( * ) Notice: Subject to any disclaimer, the term of this patent is extended or adjusted under 35 U.S.C. 154(b) by 204 days.

(21) Appl. No.: 18/766,682

(22) Filed: Jul. 9, 2024

(65) Prior Publication Data

US 2025/0027363 A1 Jan. 23, 2025

(30) Foreign Application Priority Data

Jul. 20, 2023 (TW) ................................ 112207573

(51) Int. Cl.
*E06B 9/322* (2006.01)
*E06B 9/303* (2006.01)

(52) U.S. Cl.
CPC .............. *E06B 9/322* (2013.01); *E06B 9/303* (2013.01); *E06B 2009/3222* (2013.01)

(58) Field of Classification Search
CPC .......... E06B 9/322; E06B 9/303; E06B 9/308; E06B 9/304; E06B 9/305; E06B 9/306; E06B 9/307; E06B 2009/322; E06B 9/30
See application file for complete search history.

(56) References Cited

U.S. PATENT DOCUMENTS 6,105,652 A * 8/2000 Judkins ................... E06B 9/307 160/178.3
6,318,439 B1 * 11/2001 Matsubara .............. E06B 9/307 160/115
6,581,665 B2 * 6/2003 Lin ........................... E06B 9/32 160/115
6,588,480 B2 * 7/2003 Anderson ............... E06B 9/322 160/170
7,926,540 B2 * 4/2011 Lai .......................... E06B 9/303 160/178.3

(Continued)

FOREIGN PATENT DOCUMENTS

CN 102884273 B 3/2016
EP 0 954 672 B1 5/2003

(Continued)

*Primary Examiner* — Beth A Aubrey
(74) *Attorney, Agent, or Firm* — Winston Hsu

(57) ABSTRACT

A motorized venetian blind includes a first lifting electric machine, a second lifting electric machine and a tilting electric machine for respectively control a front pull cord, a rear pull cord and a ladder cord. When a front warp and a rear warp of the ladder cord are controlled by the tilting electric machine to move downwardly and upwardly respectively to tilt the slats to the closed position, one of the pull cords on the same side as the upwardly-moving warp is controlled by the first lifting electric machine or the second lifting electric machine to move upwardly along with the upwardly-moving warp. Therefore, the synchronization of the pull cords and the ladder cord is improved, whereby closure between the slats is enhanced, and the bottom rail can be fully tilted to be mostly vertical, partially overlapping the neighboring slat for preventing light leakage.

15 Claims, 23 Drawing Sheets

(56) References Cited

U.S. PATENT DOCUMENTS

| | | | | |
|---|---|---|---|---|
| 10,988,980 | B2 * | 4/2021 | Chou | E06B 9/322 |
| 2004/0261956 | A1 * | 12/2004 | Nien | E06B 9/308 160/176.1 R |
| 2010/0122779 | A1 * | 5/2010 | Chen | E06B 9/307 160/168.1 V |
| 2017/0138123 | A1 * | 5/2017 | Chen | E06B 9/307 |
| 2019/0145162 | A1 * | 5/2019 | Chou | E06B 9/323 160/150 |
| 2019/0242186 | A1 * | 8/2019 | Chou | E06B 9/304 |
| 2020/0102785 | A1 * | 4/2020 | Hsieh | E06B 9/326 |
| 2022/0396999 | A1 * | 12/2022 | Chou | E06B 9/327 |
| 2023/0295984 | A1 * | 9/2023 | Wei | E06B 9/303 160/166.1 |

FOREIGN PATENT DOCUMENTS

| | | | |
|---|---|---|---|
| EP | 2 530 235 | A1 | 12/2012 |
| JP | 3-275889 | A | 12/1991 |
| JP | 3220380 | B2 | 10/2001 |
| JP | 5700671 | B2 | 4/2015 |
| JP | 3206027 | U | 8/2016 |
| JP | 2020-186634 | A | 11/2020 |

* cited by examiner

MOTORIZED VENETIAN BLIND

BACKGROUND OF THE DISCLOSURE

1. Field of the Disclosure

The present disclosure generally relates to a venetian blind, and more particularly relates to a motorized venetian blind with its slats closing well with each other when the motorized venetian blind is extended and its slats have been tilted to a closed position.

2. Description of the Prior Art

Venetian blinds are a type of window blind with covering material composed of multiple slats shaped like elongated plates and arranged in the horizontal direction. Those slats are suspended by a ladder cord to be located between an upper rail and a lower rail of the venetian blind. To operate the venetian blind, a lifting pull cord is utilized to move the lower rail upward or downward while the lower rail remains level, allowing the slats to be stacked from bottom to top or to extend from top to bottom, whereby the slats become arranged at intervals. According to the common usage habits of most users, the purpose of retracting the covering material is to allow light beams to pass, and the purpose of extending the covering material is to shield light beams. In order to achieve better control of lighting effects, while extending the covering material, the user usually drops down the lower rail to the lowest position as a first step, then operating a slat-angle adjusting mechanism to make one of the two warps of the ladder cord move upward and the other one of the two warps move downward, thereby generating a difference in the heights of the front and rear sides of the slats. Therefore, a tilting angle of the slats is adjusted to achieve the purpose of adequately altering the amount of light passing through the covering material.

For current venetian blinds, operating the lifting pull cord manually or under electrical control can move the lower rail upward or downward for extending or retracting the covering material. Alternatively, driving the two warps of the ladder cord with one of the warps moving upward and the other moving downward, can achieve the purpose of altering the tilting angle of the slats. The aforesaid operations of the extension and retraction of the covering material, and the aforesaid operation of altering the tilting angle of the slats, are separately performed by two independent mechanisms. Therefore, the movement of the lifting pull cord could be asynchronous with the movement of the warps of the ladder cord. In that case, when the tilting angle of the slats has been adjusted to exhibit the slats in the closed position where the slats are expected to completely shield light, the up-and-down neighboring slats usually do not close well with each other, which causes light leakage. This situation of light leakage can be even more obvious in the venetian blinds with multiple lifting pull cords in the front-and-rear configuration.

For instance, when the lower rail of the venetian blind has been dropped to the lowest position, the lifting pull cords are fully released as reaching their maximum released lengths. At this moment, the user operates the slat-angle adjusting mechanism to drive one of the two warps of the ladder cord to move upward and drive the other one of the two warps to move downward, in which one side of the lower rail corresponding to the upward-moving warp is not restricted by the corresponding lifting pull cord and capable of moving freely, whereas the other side of the lower rail corresponding to the downward-moving warp is restricted by the maximum released length of the corresponding lifting pull cord, not being able to fully descend along with the downward-moving warp. As a result, the difference in height between the two sides of the lower rail (i.e., the front and rear sides of the lower rail) would be insufficient. While the upper slats, due to their distances from the lower rail, can still be tilted to the mostly vertical position, enabling them to fully close against the neighboring slats, the decrease in the tilting angle of the slats becomes more pronounced as the slats get closer to the lower rail. Especially the lower rail itself, the tilting angle of which usually undergoes slight changes only and results in light leakage. Additionally, the volume and shape of the lower rail are generally different from the slat, and the weight of the lower rail is usually largely greater than the weight of the single slat, causing the center of gravity of the lower rail to be inconsistent with the centers of gravity of the slats while the tilting angle of the slats is adjusted. Thus, it is difficult to adjust the tilting angle of the lower rail to be consistent with the tilting angle of the slats synchronously. In conclusion, light leakage caused by the lower rail not closing well with the neighboring slat is one of the urgent problems of the current venetian blind products.

SUMMARY OF THE DISCLOSURE

In light of the above reasons, one aspect of the present disclosure is to provide a motorized venetian blind, in which when the motorized venetian blind is in an extended state and the slats thereof have been tilted to a closed position, the adequate degree of closure between the slats as well as the adequate degree of closure between the bottom rail and the neighboring slat are maintained, so that the drawback of light leakage can be improved.

To achieve the above objective, the present disclosure provides the motorized venetian blind comprising a headrail, a bottom rail, plural slats, a first lifting electric machine, a second lifting electric machine and a tilting electric machine. The bottom rail is situated below the headrail through a front pull cord and a rear pull cord which are connected to a first reeling wheel and a second reeling wheel, respectively, while the first reeling wheel and second reeling wheel are disposed on the headrail. The slats are suspended to be located between the headrail and the bottom rail. The ladder cord comprises a front warp and a rear warp, each having one end connected to a tilting wheel disposed on the headrail. The slats are located between the front warp and the rear warp. The front warp and the front pull cord pass one side of the slats, while the rear warp and the rear pull cord pass the other side of the slats. The first lifting electric machine is used for controlling the first reeling wheel to rotate, whereby the front pull cord is retracted or released. The second lifting electric machine is used for controlling the second reeling wheel, whereby the rear pull cord is retracted or released. The tilting electric machine is used for controlling the tilting wheel to rotate, whereby a vertical relative movement of the front warp and the rear warp of the ladder cord is generated, which brings the slats to be tilted between a horizontal position and a closed position. When the front pull cord and the rear pull cord are retracted concurrently or released concurrently, the bottom rail is moved between an upper limit position and a lower limit position, in which the upper limit position is close to the headrail, and the lower limit position is distanced from the headrail. When one of the front warp and the rear warp is moved upwardly for tilting the slats from the horizontal position to the closed position, the front pull cord or the rear pull cord on the same side as the upwardly-moving one of the front warp and the rear warp is also moved upwardly, whereby the bottom rail is tilted in a direction the same as the slats to a mostly vertical position and partially overlaps the neighboring slat.

Preferably, if the front pull cord is the one of the front pull cord and the rear pull cord that is moved upwardly, an amount of upward movement of the front pull cord is set to be greater than that of the front warp. Conversely, if the rear pull cord is the one of the front pull cord and the rear pull cord that is moved upwardly, an amount of upward movement of the rear pull cord is set to be greater than that of the rear warp. The aforesaid amounts of upward movements of the front pull cord, the front warp, the rear pull cord and the rear warp are measured with respect to a datum surface on the headrail while they are moved upwardly. Thus, the bottom rail can be forcibly suspended to the mostly vertical position, closing well with the neighboring slat for improving light leakage problem. On the other hand, in the case that the bottom rail has lesser length in the front-and-rear direction than the single slat, the amount of the upward movement of the pull cord is set to be equal to or smaller than that of the warp on the same side which is moved upwardly, which also facilitates the bottom rail to be forcibly suspended to the mostly vertical position and closing well with the neighboring slat for improving light leakage problem.

Preferably, when the slats are tilted from the horizontal position to the closed position, the other one of the front pull cord and the rear pull cord rather than the one moved upwardly is moved downwardly. If the front pull cord is the one moved downwardly, an amount of downward movement of the front pull cord is set to be equal to an amount of downward movement of the front warp. Conversely, if the rear pull cord is the one moved downwardly, an amount of downward movement of the rear pull cord is set to be equal to an amount of downward movement of the rear warp. The aforesaid amounts of downward movements of the front pull cord, the front warp, the rear pull cord and the rear warp are measured with respect to a datum surface on the headrail while they are moved downwardly. Thus, the bottom rail can be fully tilted along with the slats while the slats are tilted from the horizontal position to the closed position, as the side of the bottom rail that is tilted downwardly is no longer restricted by an original released length of the corresponding pull cord. Since the bottom rail can be fully tilted, the closure between the bottom rail and its neighboring slat is enhanced to improve the light leakage problem.

In one embodiment, the motorized venetian blind further comprises a first detector and a second detector used for detecting tension of the front pull cord and the rear pull cord, respectively. In response to one of the first detector and the second detector detecting tension of the corresponding pull cord smaller than a preset value while the first lifting electric machine and the second lifting electric machine are driving the first reeling wheel and the second reeling wheel to rotate respectively, the first lifting electric machine and the second lifting electric machine stop controlling the first reeling wheel and the second reeling wheel to rotate, respectively. Thus, the bottom rail can be automatically stopped when it comes into contact with an obstruction.

In one embodiment, the motorized venetian blind further comprises a first detector and a second detector, which are used for detecting tension of the front pull cord and the rear pull cord, respectively. When the first reeling wheel and the second reeling wheel are both stationary, and the first detector and the second detector both detect tension smaller than a preset value, a first control signal and a second control signal are transmitted to the first lifting electric machine and the second lifting electric machine, respectively. Thereby, the first lifting electric machine and the second lifting electric machine control the first reeling wheel and the second reeling wheel to rotate respectively, such that the front pull cord and the rear pull cord are concurrently retracted or concurrently released. Thus, the user can trigger the stationary motorized venetian blind to be extended or retracted by directly tilting the bottom rail by hands.

Another aspect of the present disclosure is to provide a motorized venetian blind comprising a headrail, a bottom rail, plural slats, a first lifting electric machine, a second lifting electric machine, a tilting electric machine, a first detector, a second detector and a controller. The first detector and the second detector are used for detecting tension of the front pull cord and the rear pull cord, respectively. The controller is electrically connected to the first lifting electric machine, the second lifting electric machine and the tilting electric machine. When the first reeling wheel and the second reeling wheel are stationary, and only the second detector between the first detector and the second detector detects tension smaller than a preset value, the controller transmits a first tilting signal to make the tilting electric machine control the tilting wheel to rotate in a first direction, whereby the rear warp is moved upwardly relative to the front warp to tilt the slats. When the first reeling wheel and the second reeling wheel are stationary, and only the first detector between the first detector and the second detector detects tension smaller than the preset value, the controller transmits a second tilting signal to make the tilting electric machine control the tilting wheel to rotate in a second direction, whereby the front warp is moved upwardly relative to the rear warp to tilt the slats. Meanwhile, either or both of the following situations occur: when the tilting electric machine controls the tilting wheel to tilt the slats to the closed position in response to the first tilting signal from the controller, the controller further controls the second lifting electric machine to drive the second reeling wheel to rotate for retracting the rear pull cord, whereby the bottom rail is tilted towards a same direction as a tilting direction of the slats to a mostly vertical position and partially overlaps the neighboring one of the slats, or/and when the tilting electric machine controls the tilting wheel to tilt the slats to the closed position in response to the second tilting signal from the controller, the controller further controls the first lifting electric machine to drive the first reeling wheel to rotate for retracting the front pull cord, whereby the bottom rail is tilted towards the same direction as the tilting direction of the slats to the mostly vertical position and partially overlaps the neighboring one of the slats.

In one embodiment, when the controller controls the tilting electric machine to drive the tilting wheel to rotate in the first direction and controls the second lifting electric machine to drive the second reeling wheel to rotate for retracting the rear pull cord, an amount of upward movement of the rear pull cord is set to be greater than that of the rear warp. Similarly, when the controller controls the tilting electric machine to drive the tilting wheel to rotate in the second direction and controls the first lifting electric machine to drive the first reeling wheel to rotate for retracting the front pull cord, an amount of upward movement of the front pull cord is set to be greater than that of the front warp. The aforesaid amounts of the upward movements of the rear pull cord, the rear warp, the front pull cord and the front warp are measured with respect to a datum surface on the headrail while they are moved upwardly.

In one embodiment, when the first reeling wheel and the second reeling wheel are stationary and the second detector detects tension smaller than the preset value, the controller further controls the first lifting electric machine to drive the first reeling wheel to rotate for releasing the front pull cord. Similarly, when the first reeling wheel and the second reeling wheel are stationary and the first detector detects tension smaller than the preset value, the controller further controls the second lifting electric machine to drive the second reeling wheel to rotate for releasing the rear pull cord.

Preferably, when the controller controls the tilting electric machine to drive the tilting wheel to rotate in the first direction and controls the first lifting electric machine to drive the first reeling wheel to rotate for releasing the front pull cord, an amount of downward movement of the front pull cord is set to be greater than that of the front warp. Similarly, when the controller controls the tilting electric machine to drive the tilting wheel to rotate in the second direction and controls the second lifting electric machine to drive the second reeling wheel to rotate for releasing the rear pull cord, an amount of downward movement of the rear pull cord is set to be greater than that of the rear warp. Thus, the bottom rail can be fully tilted along with the slats while the slats are being tilted, in which the tilting angle of the bottom rail is not restricted by the original released length of the pull cord which corresponds to the side of the bottom rail that is tilted downwardly.

In one embodiment, when the first detector and the second detector both detect tension smaller than the preset value, the controller concurrently controls the first lifting electric machine and the second lifting electric machine to change a motion state of the first reeling wheel and a motion state of the second reeling wheel, respectively, thereby performing one of the following actions: releasing the front pull cord and the rear pull cord concurrently; retracting the front pull cord and the rear pull cord concurrently; stopping the front pull cord and the rear pull cord from moving concurrently. Thus, the user can operate the motorized venetian blind to perform or to stop performing the extension or retraction of the motorized venetian blind by directly lifting the bottom rail by hands.

The motorized venetian blind of the present disclosure utilizes the first lifting electric machine or the second lifting electric machine to control one of the front and rear pull cords to move upwardly while the slats are tilted to the closed position, in which the one of the front and rear pull cords that is moved upwardly is on the same side as the one of the front and rear warps that is moved upwardly while the slats are tilted. Thereby, the bottom rail can be tilted to a vertical position where the bottom rail partially overlaps the neighboring slat, which improves the light leakage problem in the venetian blinds caused by the inconsistent tilt of the bottom rail relative to the slats.

These and other objectives of the present disclosure will no doubt become obvious to those of ordinary skill in the art after reading the t following detailed description of the preferred embodiment that is illustrated in the various figures and drawings.

BRIEF DESCRIPTION OF THE DRAWINGS

The present disclosure will be understood by referring to the following detailed description of some illustrative embodiments in conjunction with the accompanying drawings, in which.

DETAILED DESCRIPTION

Figure 1:
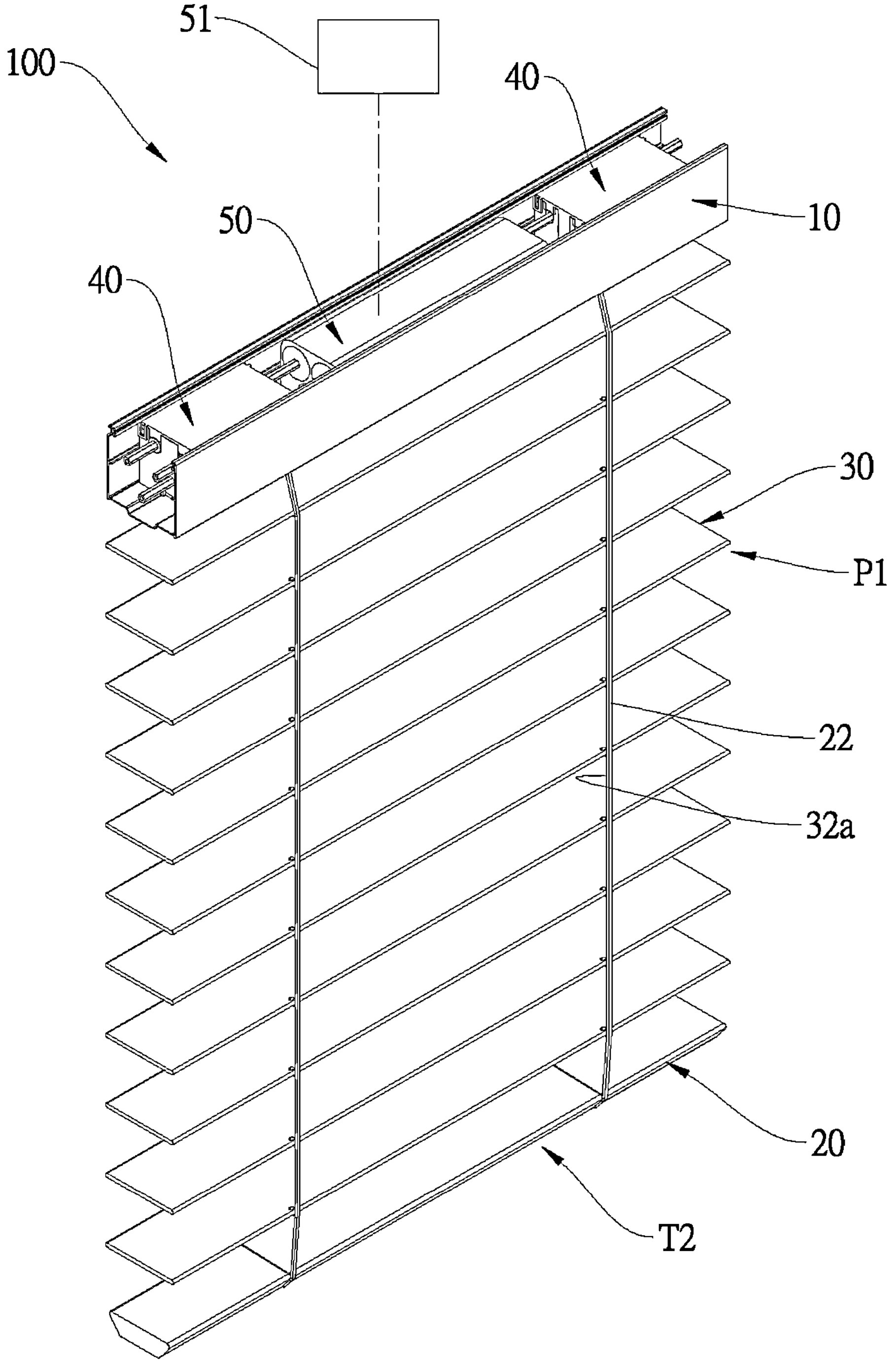
FIG. 1 is a perspective view of the motorized venetian blind according to one embodiment of the present disclosure, in which the motorized venetian blind is in an extended state.

In the following paragraphs and the accompanying drawings, the features and the implementations of several embodiments of the present disclosure are described in more detail along with the accompanying drawings. The features and the implementations described in the following paragraphs can be adopted solely or in combination with each other. In addition, the embodiments can be modified in various forms, as disclosed in the following paragraphs, and should not be limited to the embodiments described in the following paragraphs. Unless specified otherwise, the same reference characters refer to the same components.

The technical features provided in the present disclosure are not limited to the specific structures, uses, and applications described in the embodiments. The language used in the descriptions is illustrative and descriptive language which can be understood by the person of ordinary skill in the art. The terms regarding directions mentioned in the specification, including "front", "rear", "up", "down", "left", "right", "top", "bottom", "inside", and "outside", are illustrative and descriptive terms based on common usage scenarios, and manifests no intent to limit the scope of claims.

Furthermore, the definite and indefinite articles "a" and "the" and the numerical term "one" used in the specification referring to components of singular form do not exclude the concept of plural form. Equivalences known by one having ordinary skill in the art should be also included. All conjunctions used in similar situations should be interpreted in the broadest ways. The specific shapes, structural features, and technical terms described in the descriptions should also be interpreted to include equivalent structures and techniques which could achieve the same functionality.

Please refer to FIGS. 1 to 4, which show a motorized venetian blind 100 according to one embodiment of the present disclosure. The motorized venetian blind 100 comprises a headrail 10, a bottom rail 20, plural slats 30 shaped like elongated plates or thin sheets, two cord control units 40, and an electric machine unit 50. The bottom rail 20 is suspended below the headrail 10 by two pairs of front-and-rear configured pull cords. In other words, each pair of pull cords includes a front pull cord 22 and a rear pull cord 24. The slats 30 are suspended by two ladder cords 32 to be located between the headrail 10 and the bottom rail 20. The two cord control units 40 and the electric machine unit 50 are disposed in the headrail 10, and the electric machine unit 50 is located between the two cord control units 40.

One side of the motorized venetian blind 100 corresponding to the front pull cord 22 is defined as a "front side" hereinafter, while the other side of the motorized venetian blind 100 corresponding to the rear pull cord 24 is defined as a "rear side" hereinafter. Moreover, a "left side" and a "right side" of the motorized venetian blind 100 are defined in premise of viewing the motorized venetian blind 100 from the front side thereof. Those directional definitions are applied to all of the oriental related description in the following context and will not be redundantly referred to below.

Referring to FIGS. 1 to 5, the headrail 10 is generally a U-shaped frame composed of a bottom plate 12 and two side plates 14. The two side plates 14 are connected to the bottom plate 12 in the front-and-rear configuration. The bottom plate 12 has two pairs of cord holes 12*a*, 12*b* penetrating through a top surface and a bottom surface of the bottom plate 12. Each pair of cord holes 12*a*, 12*b* is arranged in the front-and-rear configuration and located at each of the left and right sides of the bottom rail 12. Additionally, a datum surface B (shown in FIG. 3) is defined as coinciding with the bottom surface of the bottom plate 12. The two cord control units 40 have the same structures and each include a first reeling wheel 44, a second reeling wheel 46 and a tilting wheel 48, which are all disposed within a box 42. In order to achieve convenience for describing, the cord control unit 40 on the left side is taken as an example in the following context. One end of the front pull cord 22 is connected to the first reeling wheel 44, while one end of the rear pull cord 24 is connected to the second reeling wheel 46. The other ends of the front pull cord 22 and the rear pull cord 24 penetrate through two through holes 42*a*, 42*b* of the box 42, respectively, then correspondingly penetrating through the cord holes 12*a*, 12*b* of the headrail 10, finally being fixedly connected to the bottom rail 20. Meanwhile, the front pull cord 22 passes the front side of the slats 20, and the rear pull cord 24 passes the rear side of the slats 20. The front side of the slats 20 faces the indoor space, while the rear side of the slats 20 faces the outdoors.

Figure 3:
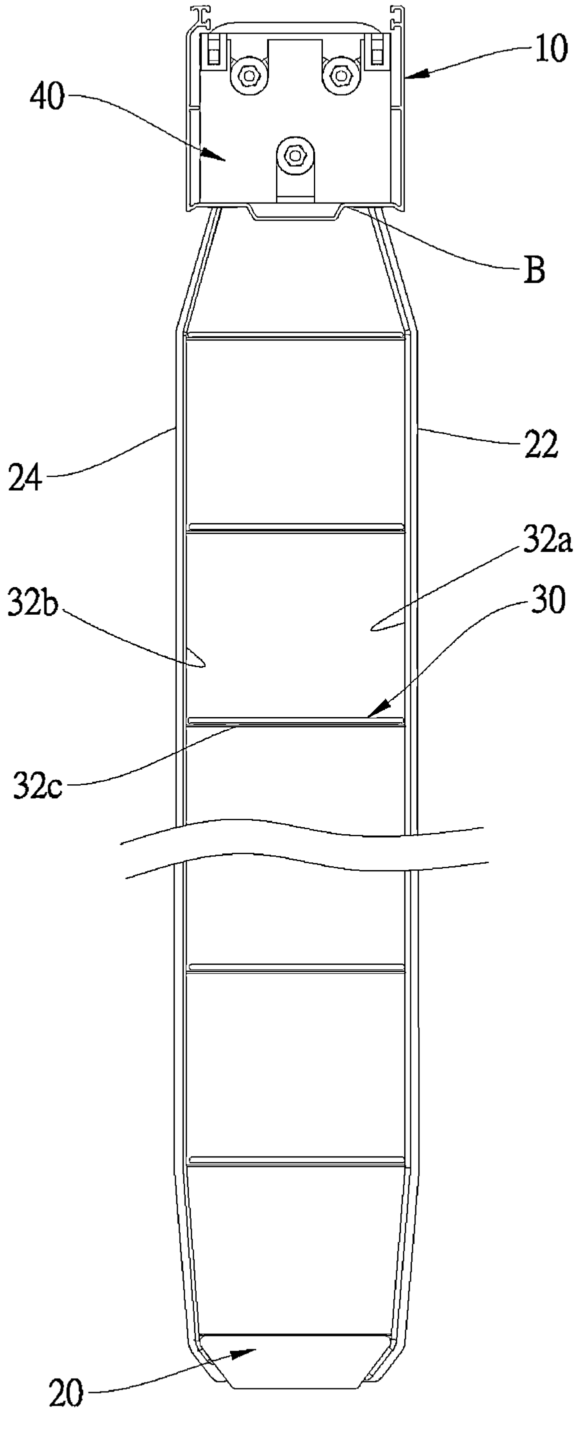
FIG. 3 is a lateral side view of the motorized venetian blind in FIG. 1.

Each of the two ladder cords 32 comprises a front warp 32*a*, a rear warp 32*b* and plural wefts 32*c*. While the ladder cord 32 is in the extended state, the front warp 32*a* and the rear warp 32*b* are arranged longitudinally, and the wefts 32*c* are arranged horizontally in the front-and-rear direction. The front warp 32*a* and the rear warp 32*b* each have one end connected to the tilting wheel 48, while the other ends of the front warp 32*a* and the rear warp 32*b* run down and pass through the through holes 42*a*, 42*b* of the box 42, respectively, then correspondingly passing through the cord holes 12*a*, 12*b* of the headrail 10, finally being connected to the bottom rail 20. In some other embodiments of the present disclosure, after the front warp and the rear warp pass out from the cord holes of the headrail, they extend downwardly and then are connected to the lowest one of the arranged slats. This configuration in which the front warp and the rear warp are not connected to the bottom rail can also be implemented. As shown in FIG. 3, the front warp 32*a* passes the front side of the slats 30, and the rear warp 32*b* passes the rear side of the slats 30. In other words, the slats 30 are located in the space between the front warp 32*a* and the rear warp 32*b*. Moreover, there are plural loops (not shown in the figures) connected to each of the front warp 32*a* and the rear warp 32*b*, which are provided to be passed through by the front pull cord 22 and the rear pull cord 24, respectively. The wefts 32*c* are arranged at equal intervals. Each of the wefts 32*c* has two ends connected to the front warp 32*a* and the rear warp 32*b*, respectively, and supports one of the slats 30 thereon. It is worthy noticing that once the front pull cord 22, the rear pull cord 24, the front warp 32*a* and the rear warp 32*b* pass through the cord holes 12*a*, 12*b* of the headrail 10, they are also deemed to pass through the datum surface B.

The electric machine unit 50 comprises a first lifting electric machine 54, a second lifting electric machine 56 and a tilting electric machine 58, all of which are disposed in a case 52. Each of the first lifting electric machine 54, the second lifting electric machine 56 and the tilting electric machine 58 is electrically connected to a controller 51. The first lifting electric machine 54 is used for driving a first shaft 54*a* penetrating through the first reeling wheel 44 to rotate, whereby the first shaft 54*a* can bring the first reeling wheel 44 to rotate concurrently. The second lifting electric machine 56 is used for driving a second shaft 56*a* penetrating through the second reeling wheel 46 to rotate, whereby the second shaft 56*a* can bring the second reeling wheel 46 to rotate concurrently. The tilting electric machine 58 is used for driving a third shaft 58*a* penetrating through the tilting reeling wheel 48 to rotate, whereby the third shaft 58*a* can bring the tilting reeling wheel 48 to rotate concurrently.

Figure 2:
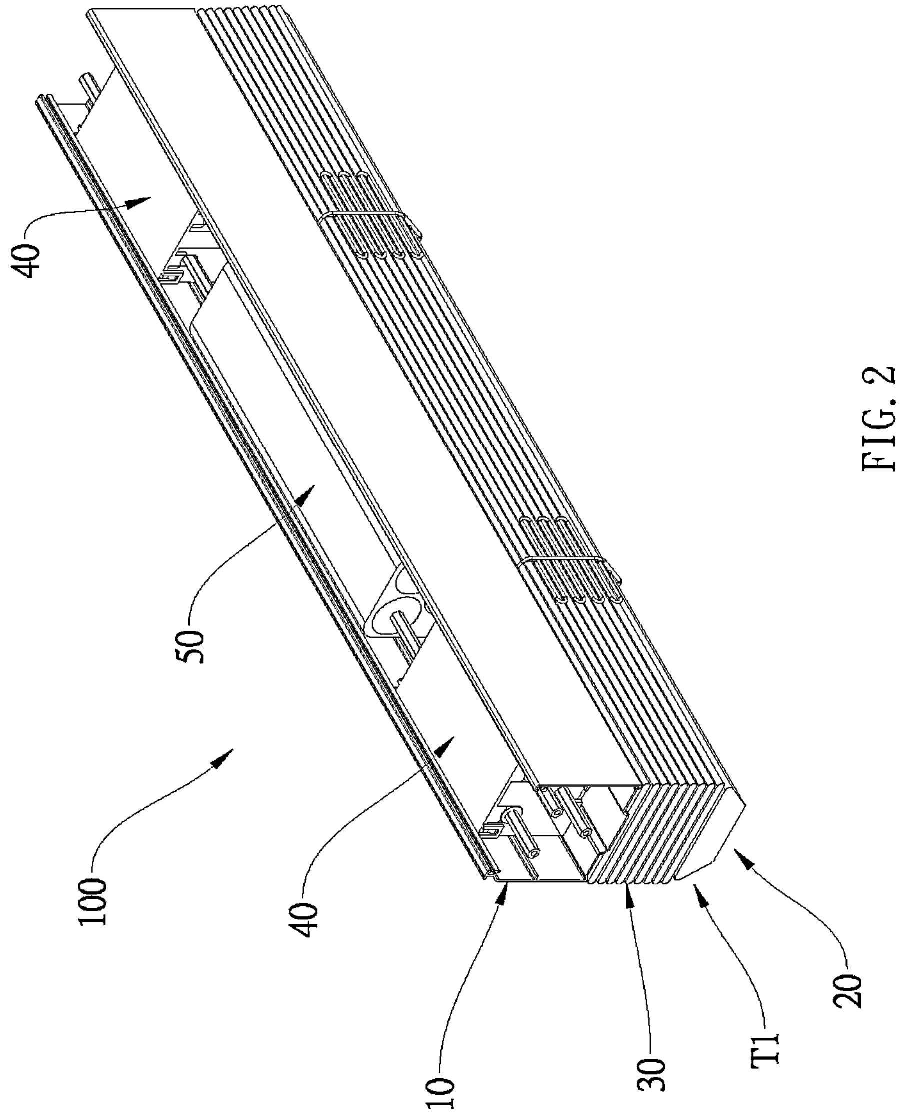
FIG. 2 is a perspective view of the motorized venetian blind in FIG. 1, in which the motorized venetian blind is in a retracted state.

Referring to FIG. 1 and FIG. 2, when the controller 51 of the electric machine unit 50 controls the first lifting electric machine 54 and the second lifting electric machine 56 to drive the first reeling wheel 44 and the second reeling wheel 46 to rotate in the forward or reverse direction, the retraction or release operation of the front pull cord 22 and the rear pull cord 24 is correspondingly performed to bring the bottom rail 20 to move between an upper limit position T1 close to the headrail 10 and a lower limit position T2 distanced from the headrail 10. The upper limit position T1 refers to a position of the bottom rail 20 after the bottom rail 20 has been lifted while remaining level, causing the slats 30 to become one stacked on top of the other from bottom to top until the topmost slat 30 is close to the bottom of the headrail 10. The lower limit position T2 refers to a position of the bottom rail 20 when the bottom rail 20 has been lowered while remaining level, causing the slats 30 to become one spaced apart from the other from top to bottom until the front pull cord 22 and the rear pull cord 24 each have been released for a predetermined length, at which point the bottom rail 20 still remains level. The above-mentioned predetermined length is highly related to the height of the frame of the window, generally enabling the motorized venetian blind 100 to roughly cover the whole window.

When the controller 51 of the electric machine unit 50 controls the tilting electric machine 58 to drive the tilting wheel 48 to rotate, one of the front warp 32*a* and the rear warp 32*b* ascends while the other one of the front warp 32*a* and the rear warp 32*b* descends. Thus, a vertical relative movement of the front warp 32*a* and the rear warp 32*b* is generated, whereby the slats 30 are tilted between a horizontal position P1 and a closed position P2 or P2' in which the slats 30 may become closely adjacent to each other. The horizontal position P1 refers to the slats 30 in the horizontal state (see FIG. 1), at which point light beams can pass through each neighboring two of the slats 30. The closed position P2 or P2' refers to the slats 30 which have been tilted in different tilting directions to the mostly vertical position, in which the bottom of one slat 30 partially overlaps the top of another slat 30 for shielding light. More specifically, the closed position P2 refers to each of the slats 30 is in a state with its front end lower and rear end higher (see FIG. 6 and FIG. 7), and the closed position P2' refers to each of the slats 30 in a state with its front end higher and rear end lower (see FIG. 8). In the preceding context, the term of "overlap" refers to both situations of "physical overlap" and "visual overlap", which means the bottom of one of the slats 30 may directly touch and attach to the top of another slat 30, or may only be closely adjacent to the top of another slat 30 without direct contact. In those cases, when viewed from the front side or the rear side of the motorized venetian blind 100, one of the slats 30 covers part of another slat 30, or alternatively, one of the slats 30 is partially covered by another slat 30.

In another embodiment of the present disclosure, the configuration of the pull cords is the same as the previous embodiment, whereas the configuration of the warps differs from the previous embodiment. More specifically, the front pull cord and the rear pull cord each have one end connected to a first reeling wheel and a second reeling wheel within the headrail, respectively, while the other ends of the front pull cord and the rear pull cord are both connected to the bottom rail. However, the front warp and the rear warp each have one end connected to a tilting wheel within the headrail, while the other ends of the front warp and the rear warp are connected to the lowest one of the slats instead of being connected to the bottom rail as exemplified in the previous embodiment. The first reeling wheel, the second reeling wheel and the tilting wheel, are controlled by the first lifting electric machine, the second lifting electric machine and the tilting electric machine, respectively. Since the motorized venetian blind of the present disclosure has the front pull cord, the rear pull cord and the warps thereof independently controlled by different electric machines, and the slats and the bottom rail are independently driven to move by the ladder cords and the pull cords, respectively, the configuration of the ladder cords and the pull cords can be particularly designed for solving the problem of insufficient closure of the venetian blinds in the art caused by inconsistency of the actions of the warps and pull cords.

In the embodiment shown in FIGS. 1 to 3, when the motorized venetian blind 100 has been fully extended, i.e., the bottom rail 20 is located at the lower limit position T2, the user is allowed to activate the tilting electric machine 58 via the controller 51 to drive the tilting wheel 48 to rotate in a preset direction for tilting the slats 30 from the horizontal position P1 to the closed position P2 or P2' for obstructing light beams from entering the indoor space. In the present embodiment, the preset direction is a first direction. The rotation of the tilting wheel 48 in the first direction facilitates the front warp 32*a* of the ladder cord 32 to be partially released downwardly and facilitates the rear warp 32*b* to be partially retracted upwardly at the same time. Moreover, as the tilting wheel 48 rotates, the controller 51 synchronously activates the second lifting electric machine 56 to control the second reeling wheel 46 to rotate for partially retracting the rear pull cord 24.

Figure 6:
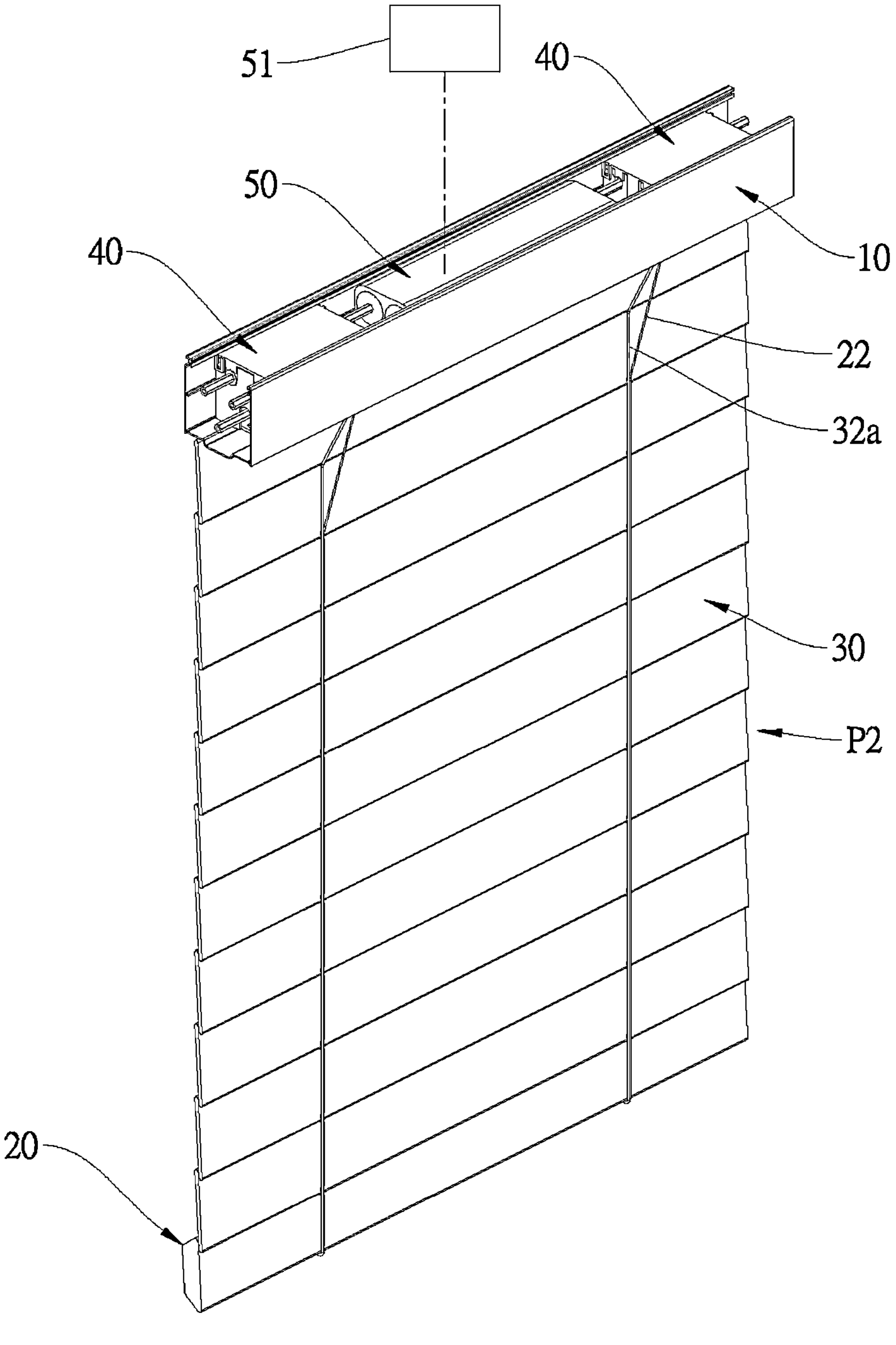
FIG. 6 is a perspective view of the motorized venetian blind in FIG. 1, in which the slats are in a closed position.
Figure 7:
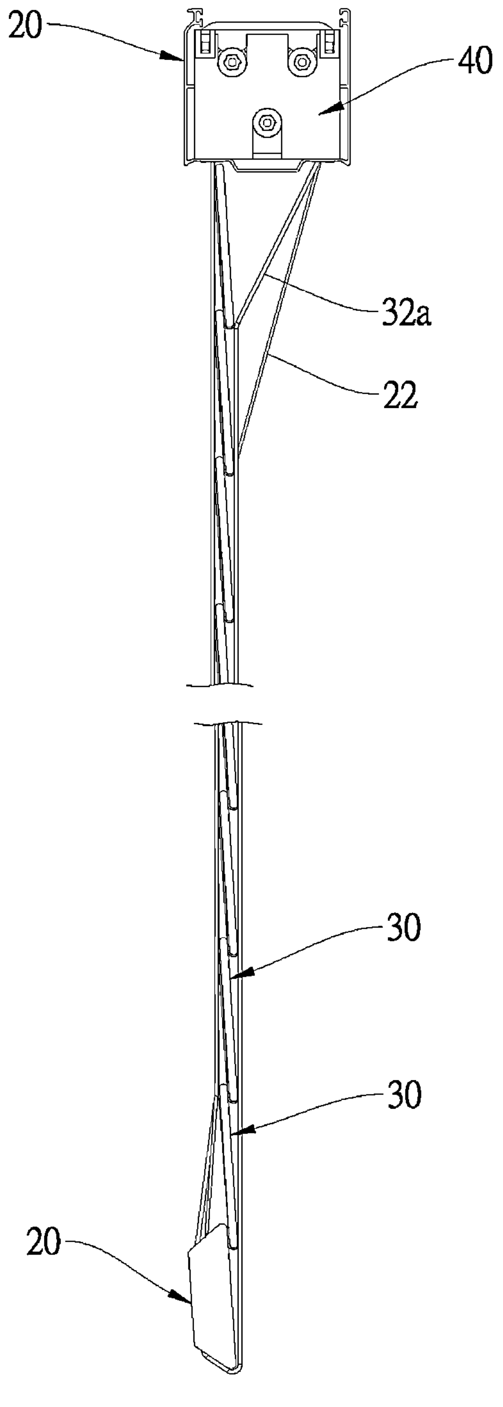
FIG. 7 is a lateral side view of the motorized venetian blind in FIG. 6.

It is worthy noticing that based on the fact that the length of the bottom rail 20 in the front-and-rear direction is mostly the same as the length of each of the slats 30 in the front-and-rear direction in the present embodiment, the aforesaid retraction operation of the rear pull cord 24 is performed in a manner that the amount of the upward movement of the rear pull cord 24 is set to be greater than or equal to the amount of the upward movement of the rear warp 32*b*. The aforesaid amount of the upward movement is defined hereinafter as the amounts of the movements of the rear pull cord 24 and the rear warp 32*b* while they are moved upwardly with respect to the datum surface B. Moreover, it is preferable to set the amount of the upward movement of the rear pull cord 24 to be greater than the amount of the upward movement of the rear warp 32*b*. The reason is that if simply setting the amount of the upward movement of the rear pull cord 24 to be equal to the amount of the upward movement of the rear warp 32*b* in practice, the bottom rail 20 may not have a sufficient tilting angle, due to having inconsistent center of gravity relative to each of the slats 30 or due to being restricted by the fixed length of the front pull cord 22. In comparison, in the case of setting the amount of the upward movement of the rear pull cord 24 to be greater than the amount of the upward movement of the rear warp 32*b*, the entire bottom rail 20 can be directly suspended, whereby the center of gravity of the bottom rail 20 is forcibly changed in place, making the bottom rail 20 in a mostly upright state and be close to or abut against the bottom of the neighboring slat 30. Moreover, as the bottom rail 20 is suspended with a tendency to tilt towards the front-and-downward direction, the bottom rail 20 thereby applies a pushing force to one or multiple slats 30 nearby, which also facilitates an effective sealing effect of the slats 30 near the bottom rail 20, as shown in FIG. 6 and FIG. 7. Thus, the drawback of light leakage exists in the current structure can be improved.

Nevertheless, the amount of upward movement of the rear pull cord 24 can be set in different manners in accordance with the shape of the bottom rail and is not limited to the examples herein. In some other embodiments, the length of the bottom rail in the front-and-rear direction is obviously smaller than the length of each of the slats 30 in the front-and-rear direction. That is, the bottom rail has a narrow shape and is narrower than each of the slats 30 in the front-and-rear direction. Therefore, in the process of pivotal rotation of the slats as well as the bottom rail while they are tilted from the horizontal state to the vertical state, the rotational radius of the bottom rail is shorter than the rotational radius of each of the slats 30. In such a situation, retracting the rear pull cord 24 in a manner that the amount of the upward movement of the rear pull cord 24 is set to be smaller than the amount of the upward movement of the rear warp 32*b*, can make the bottom rail tilted to be mostly vertical and effectively close with the slat 30. In other words, for the motorized venetian blind 100 of the present disclosure, through setting the second lifting electric machine 56, the amount of the upward movement of the rear pull cord 24 can be flexibly adjusted in accordance with the shape and design of the bottom rail, and can be adjusted to be smaller than, greater than or equal to the amount of the upward movement of the rear warp 32*b* for making the bottom rail close well with the neighboring slat 30.

In still another embodiment of the present disclosure, when the user activates the tilting electric machine 58 via the controller 51 to drive the tilting wheel 48 to rotate in the first direction, the controller 51 concurrently activates the second lifting electric machine 56 to control the second reeling wheel 46 to rotate for partially retracting the rear pull cord 24, and concurrently activates the first lifting electric machine 54 to control the first reeling wheel 44 to rotate for partially releasing the front pull cord 22, in which the front pull cord 22 is released in a manner that the amount of the downward movement of the front pull cord 22 is set to be greater than or equal to the amount of the downward movement of the front warp 32*a*. The aforesaid amounts of the downward movements of the front pull cord 22 and the front warp 32*a* are defined hereinafter as the amounts of the movements of the front pull cord 22 and the front warp 32*a* while they are moved downwardly with respect to the datum surface B. Thereby, the front side of the bottom rail 20 is liberated from the limit of the predetermined length of the front pull cord 22 that is originally released out, and can be lowered along with the descent of the front warp 32*a*. Moreover, it is preferable to set the amount of the downward movement of the front pull cord 22 to be greater than the amount of the downward movement of the front warp 32*a*, which allows for a greater amount of tilt of the front side of the bottom rail 20. Therefore, the tilt of the slats 30 is intensified by the tilt of the bottom rail 20, and the bottom rail 20 can be extremely close to or abut against the neighboring slat 30 because the bottom rail 20 has a sufficient tilting angle as shown in FIG. 6 and FIG. 7. Thus, the drawback of light leakage exists in the current structure can be improved.

Figure 8:
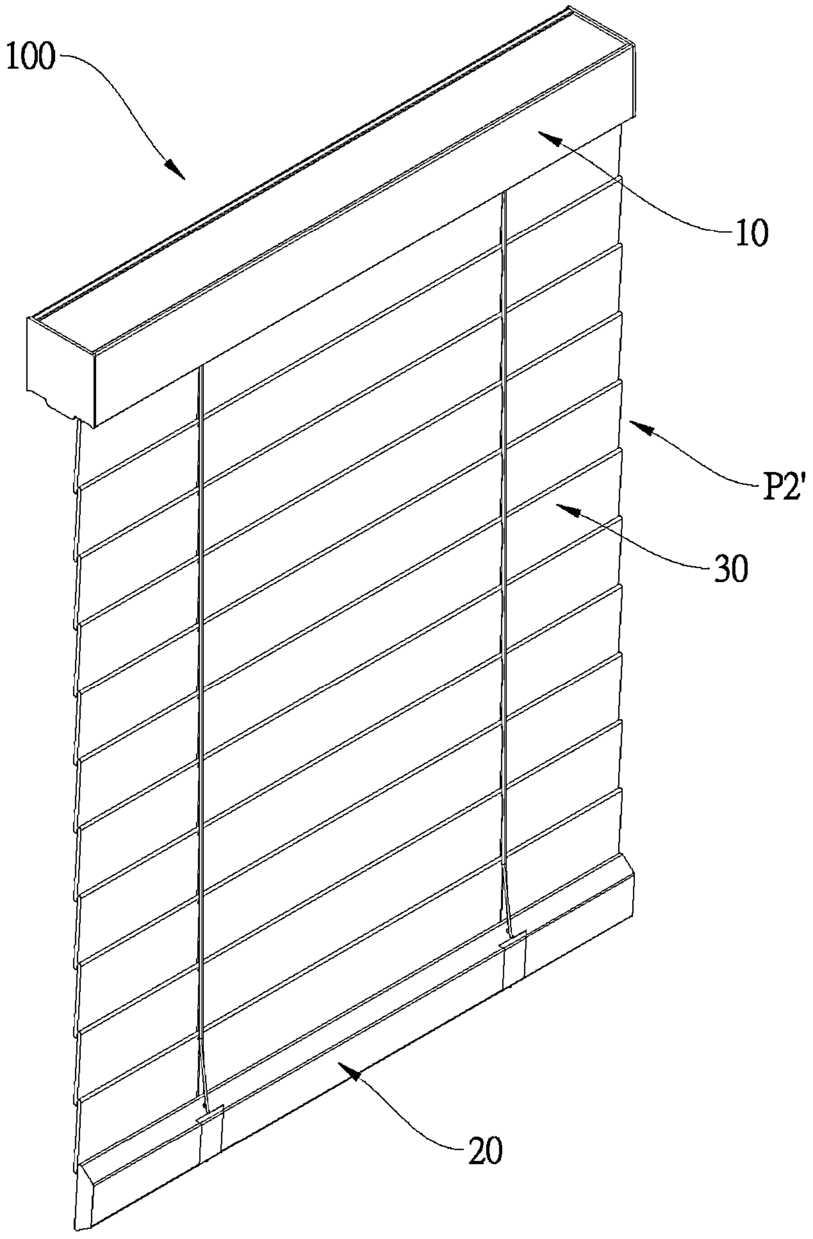
FIG. 8 is a perspective view of the motorized venetian blind in FIG. 1, in which the slats are in the closed position.

In yet another embodiment of the present disclosure, the tilting electric machine 58 is activated by the controller 51 to drive the tilting wheel 48 to rotate in the preset direction, and the preset direction is a second direction. The rotation of the tilting wheel 48 facilitates the rear warp 32*b* of the ladder cord 32 to be partially released in the downward direction, and facilitates the front warp 32*a* to be partially retracted in the upward direction at the same time. In the process of the tilting wheel 48 rotating, the controller 51 synchronously activates the first lifting electric machine 54 to control the first reeling wheel 44 to rotate for retracting a part of the front pull cord 22, in which the amount of the upward movement of the front pull cord 22 is set to be greater than or equal to the amount of the upward movement of the front warp 32*a*. The aforesaid amounts of the upward movements of the front pull cord 22 and the front warp 32*a* are defined hereinafter as the amounts of the movements of the front pull cord 22 and the front warp 32*a* while they are moved upwardly with respect to the datum surface B. Furthermore, the controller 51 also synchronously activates the second lifting electric machine 56 to control the second reeling wheel 46 to rotate for releasing a part of the rear pull cord 24, in which the amount of the downward movement of the rear pull cord 24 is set to be greater than or equal to that of the rear warp 32*b*, or alternatively, the amount of the downward movement of the rear pull cord 24 is set to be equal to the amount of the upward movement of the front pull cord 22. The aforesaid amounts of the downward movements of the rear pull cord 24 and the rear warp 32*b* are defined hereinafter as the amounts of the movements of the rear pull cord 24 and the rear warp 32*b* while they are moved downwardly with respect to the datum surface B. Thereby, the bottom rail 20 reaches a sufficient tilting angle, and gets extremely close to or abuts against the neighboring slat 30, as shown in FIG. 8. Thus, the drawback of light leakage exists in the current structure can be improved.

Although the preset direction has been exemplified as the first direction and the second direction in the above-mentioned embodiments, those are only examples taken for conveniently understanding. The aforesaid first direction can be set to the second direction which is opposite to the first direction, and vice versa. It can be understood that if the preset direction is set to be changed, the moving directions of the front warp 32*a*, the rear warp 32*b*, the front pull cord 22 and the rear pull cord 24 will become opposite to those described in the original embodiment, while the principle of setting the amounts of the movements of the warps and the pull cords will remain the same for generating the same effect that the bottom rail 20 achieves a sufficient tilting angle and closes well with the neighboring slat 30.

Moreover, with the aim of stably bring the bottom rail 20 to ascend or descend, there are preferably two pairs of the front pull cord 22 and the rear pull cord 24 disposed for moving the bottom rail 20 in the above-mentioned manners. Nevertheless, there can also be only one pair of the front pull cord and the rear pull cord as long as fulfilling the demand of stably ascending or descending the bottom rail 20, e.g., disposing the front pull cord in the left side and disposing the rear pull cord in the right side.

In addition, the motorized venetian blind 100 comprises two cord control units 40 disposed on the left and right sides of the electric machine unit 50, respectively. Meanwhile, there are two pairs of the pull cords for pulling the bottom rail 20. Based on the above conditions, the motorized venetian blind 100 of the present disclosure can further comprise a first detector and a second detector disposed corresponding to the two cord control units 40 in location, respectively, thereby augmenting the operation methods of the motorized venetian blind 100.

Figure 5:
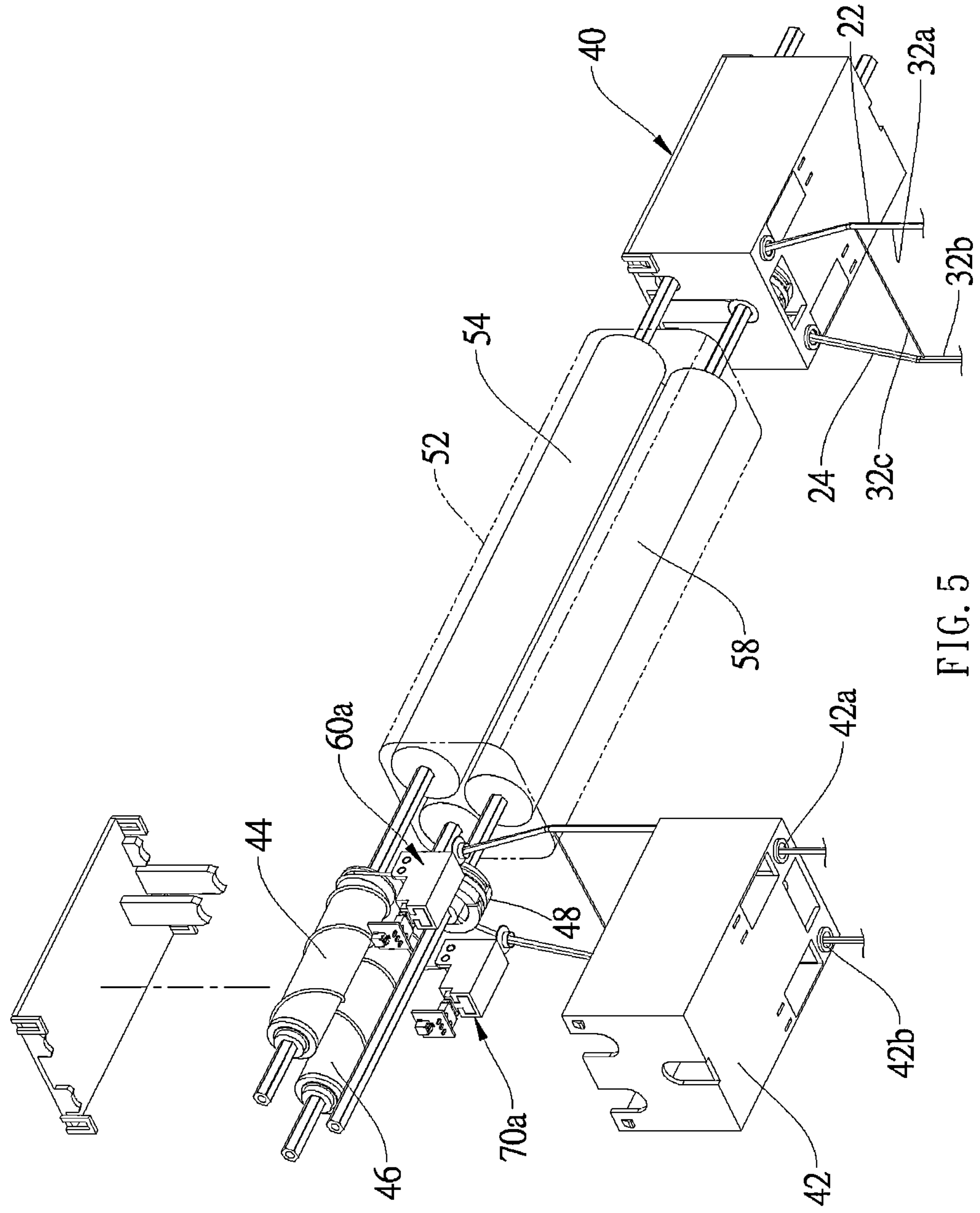
FIG. 5 is a perspective view of the cord control units and the electric machine unit in FIG. 4 viewed from another angle.
Figure 9:
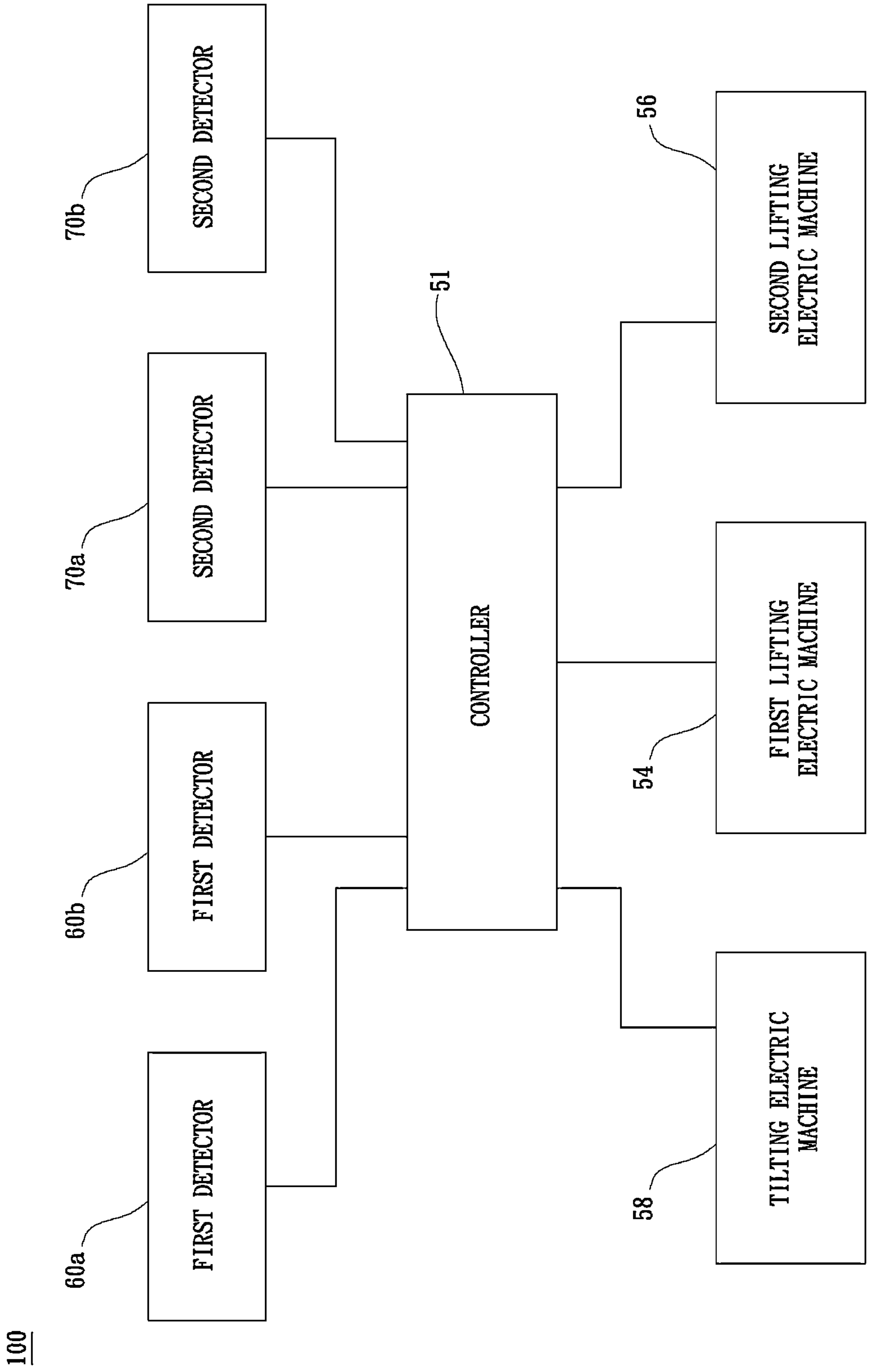
FIG. 9 is a block diagram illustrating the electrically connected components of the motorized venetian blind in FIG. 1.
Figure 10:
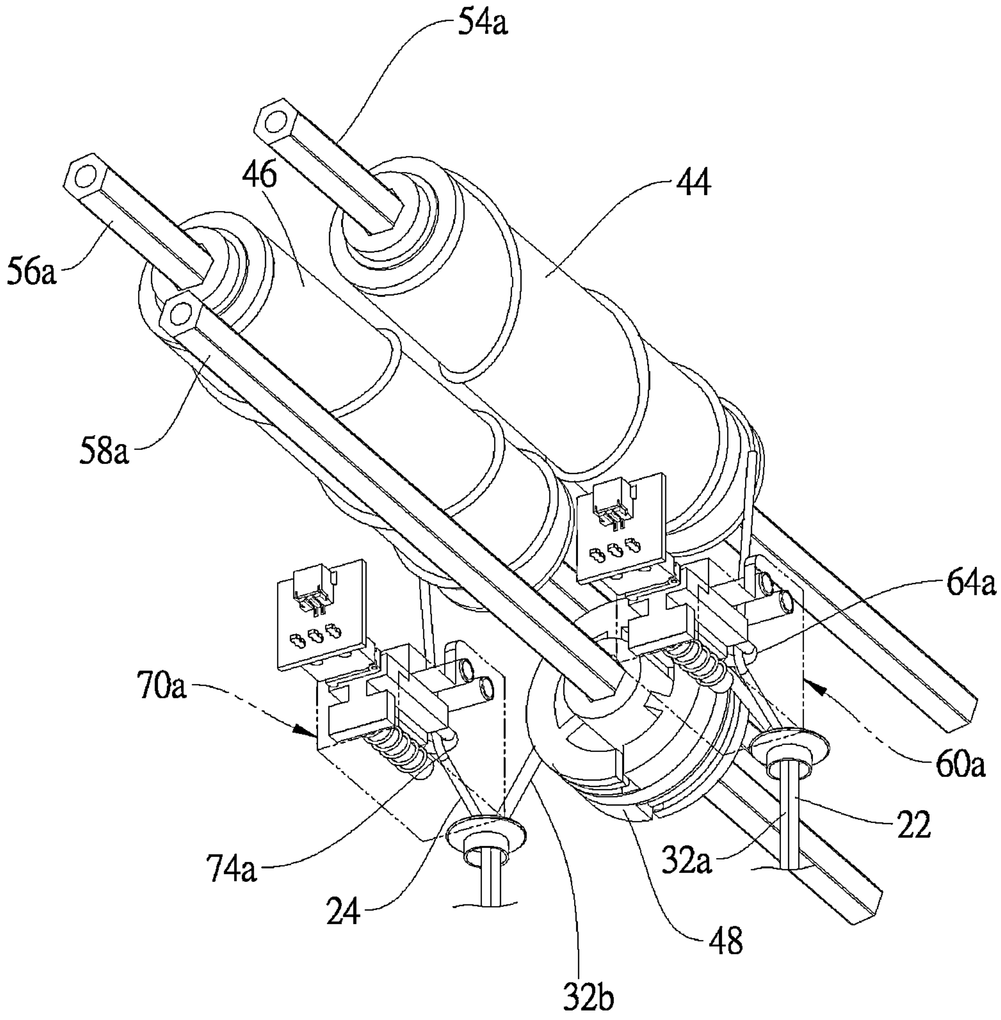
FIG. 10 is a perspective view of one of the cord control units and its detectors within the motorized venetian blind in FIG. 1.

Please refer to FIG. 5, FIG. 9 and FIG. 10. The motorized venetian blind 100 comprises two first detectors 60*a*, 60*b* and two second detectors 70*a*, 70*b* (shown in FIG. 9), which are disposed within the headrail 10 and electrically connected to the controller 51. The two first detectors 60*a*, 60*b* are disposed correspond to the two front pull cords 22 on the left and right sides, respectively, for detecting change of the tension of the corresponding front pull cords 22. The two second detectors 70*a*, 70*b* are disposed correspond to the two rear pull cords 24 on the left and right sides, respectively, for detecting change of the tension of the corresponding rear pull cords 24. With this configuration, the user is not only allowed to operate the retraction and extension of the motorized venetian blind 100 and the tilt of the slats 30 via the controller 51, but also allowed to operate the retraction and extension of the motorized venetian blind 100 and the tilt of the slats 30 by directly operating the bottom rail 20, such as lifting, tilting or any other way facilitating change of tension of the pull cords.

Figure 11:
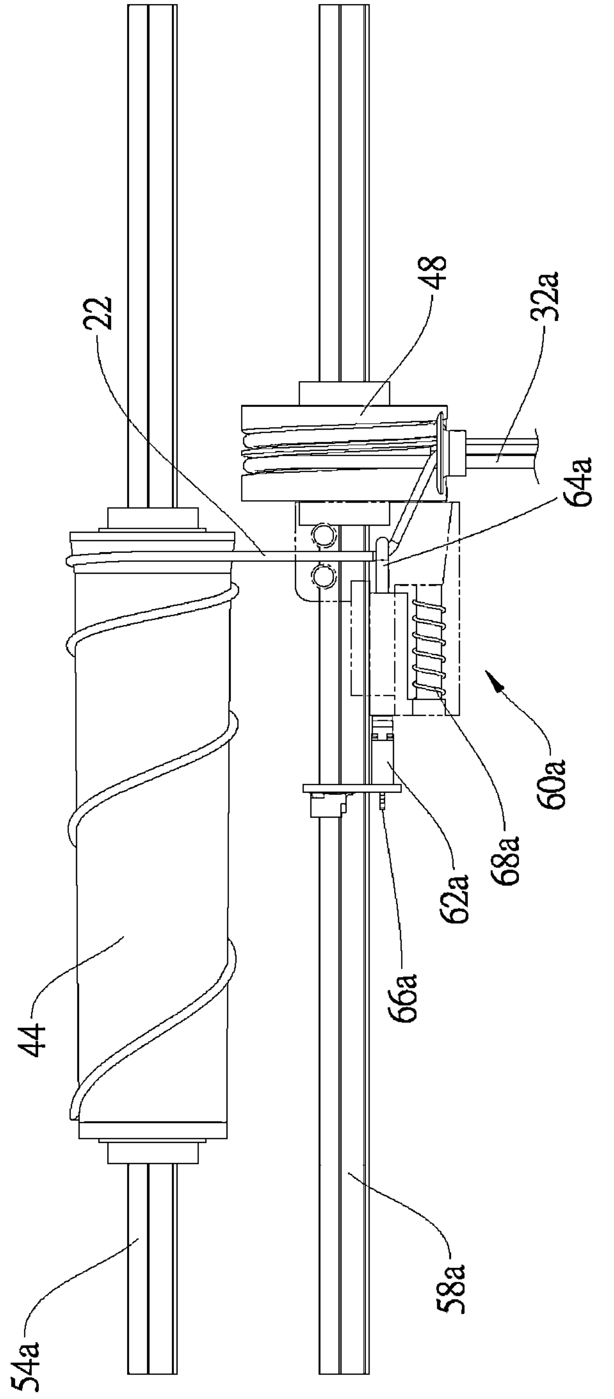
FIG. 11 is a front view of the components shown in FIG. 10.

In the present embodiment, each of the first detectors 60*a*, 60*b* and the second detectors 70*a*, 70*b* is a microswitch electrically connected to the controller 51, and all of them have the same structures. As shown in FIG. 10 and FIG. 11, taking the first detector 60*a* corresponding to the front pull cord 22 on the left side as an example, the first detector 60*a* comprises a driving member 62*a*, a pull ring 64*a*, a fixed contact 66*a* and a spring 68*a*. The driving member 62*a* has a first end and an opposing second end. Furthermore, the driving member 62*a* comprises a movable contact located on its first end, while the second end of the driving member 62*a* is connected to the pull ring 64*a*. The spring 68*a* provides an elastic restoring force to the driving member 62*a* in the direction oriented from the second end of the driving member 62*a* to the first end of the driving member 62*a*. The front pull cord 22 deflects after passing through the pull ring 64*a*, which is located within the first detector 60*a*. In a normal situation, the front pull cord 22 is tightened to be in a taut state for maintaining a balanced relationship with the pull ring 64*a*, enabling the driving member 62*a* to resist the elastic restoring force applied by the spring 68*a* and to remain in place. Thus, the movable contact of the driving member 62*a* is isolated from the fixed contact 66*a*. Once the front pull cord 22 becomes loose from the taut state, the driving member 62*a* displaces under the effect of the elastic restoring force applied by the spring 68*a*, and the movable contact thereof comes into contact with the fixed contact 66*a*, which triggers the first detector 60*a* to transmit a signal to the controller 51. In a similar manner, the rear pull cord 24 on the left side passes through the pull ring 74*a* which is located within the second detector 70*a*, and is in a taut state under normal circumstances. Once the rear pull cord 24 becomes loose from the taut state, the second detector 70*a* is triggered to transmit a signal to the controller 51.

Figure 12:
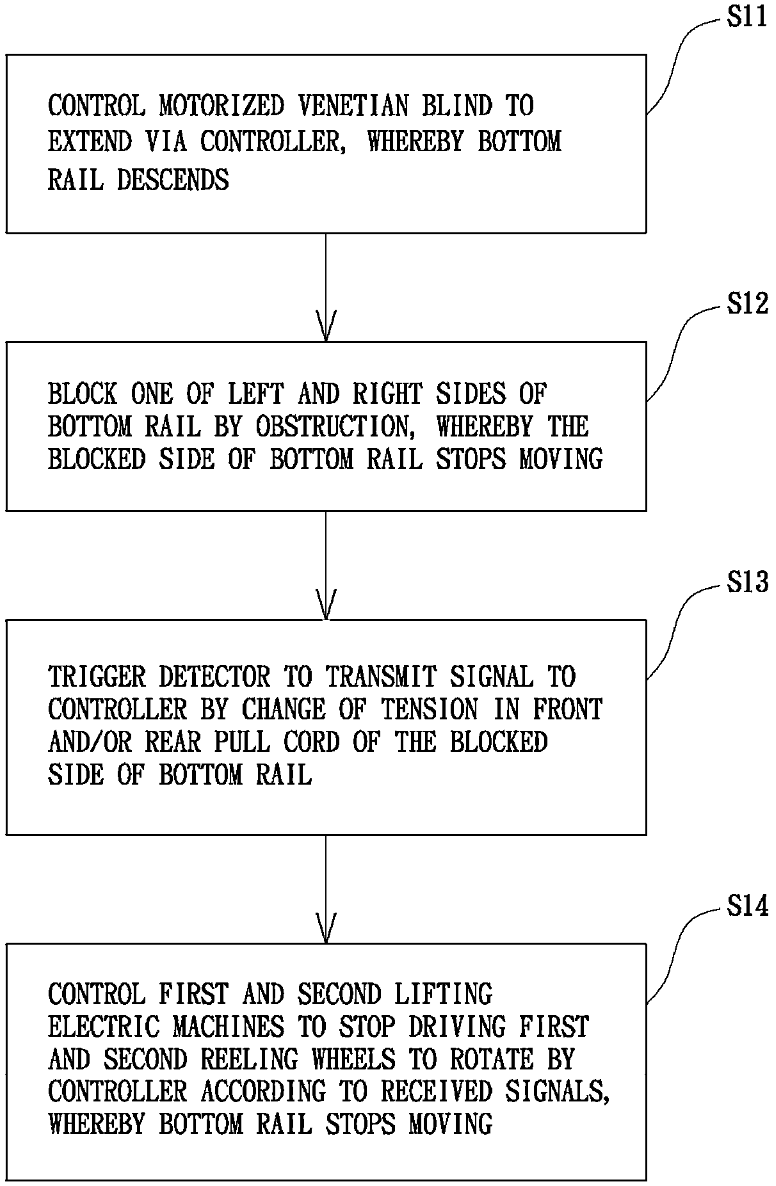
FIG. 12 is a flow diagram of one embodiment of an operation method of the motorized venetian blind in FIG. 1.

Please refer to FIG. 12, which shows a flow diagram of an operation method of the motorized venetian blind 100 in FIG. 1. Firstly, at step S11, the user controls the motorized venetian blind 100 to extend via the controller 51, in which the bottom rail 20 moves downwardly towards the lower limit position T2. Afterwards, at step S12, one of the left and right sides of the bottom rail 20 comes into contact with an obstruction and stops moving downwardly, while the other one of the left and right sides of the bottom rail 20 keeps moving downwardly. As a result, the bottom rail 20 is slanted with asymmetry, leaning left and right. At step S13, the front pull cord 22 and/or the rear pull cord 24 corresponding to the side of the bottom rail 20 blocked by the obstruction become loose from the taut state, such that their tension decreases and at least one of the detectors corresponding thereto consequently transmits a signal to the controller 51. The aforesaid detectors refer to the first detectors 60*a*, 60*b* corresponding to the front pull cords 22 on the left and right sides, and the second detectors 70*a*, 70*b* corresponding to the rear pull cords 24 on the left and right sides. At step S14, the controller 51 receives at least one signal, and accordingly controls the first lifting electric machine 54 and the second lifting electric machine 56 to stop driving the first reeling wheel 44 and the second reeling wheel 46 to rotate at the same time. Thus, the bottom rail 20 stops descending further, pending obstruction clearance.

Figure 13:
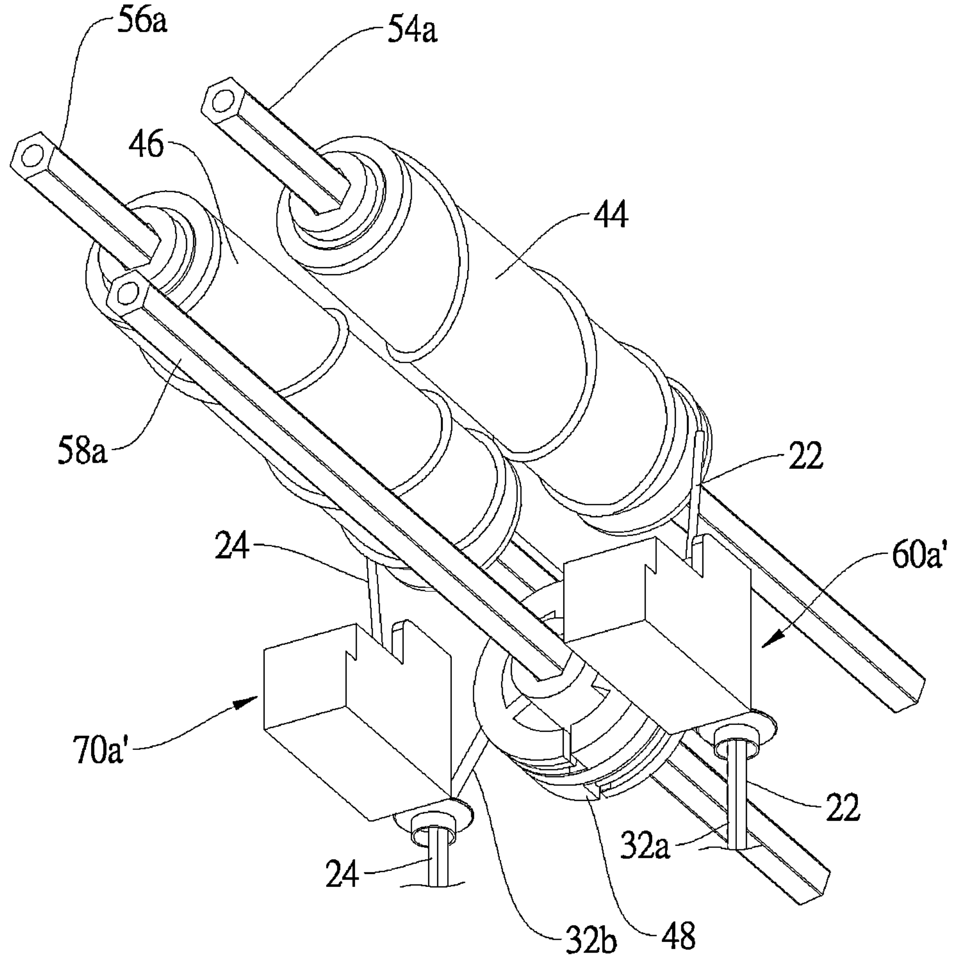
FIG. 13 is a perspective view of one of the cord control units and its detectors within the motorized venetian blind, according to another embodiment of the present disclosure.
Figure 14:
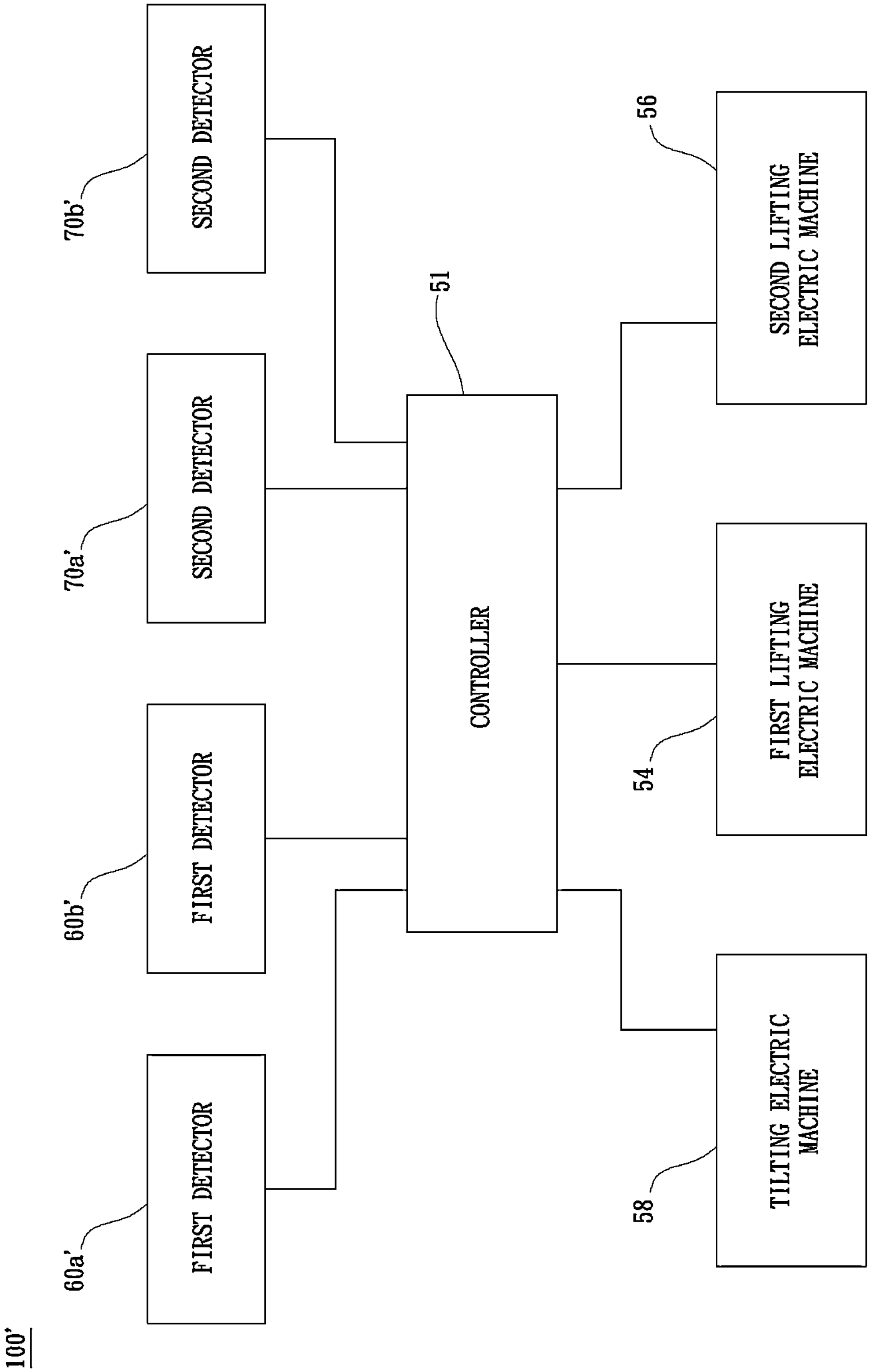
FIG. 14 is a block diagram illustrating the electrically connected components of the motorized venetian blind in FIG. 13.

Please refer to FIG. 13 and FIG. 14. FIG. 13 is a perspective view of the cord control unit and the detectors comprised of the motorized venetian blind according to another embodiment of the present disclosure. FIG. 14 is a block diagram showing the electrical connections among components of the motorized venetian blind in FIG. 13. In this embodiment, the motorized venetian blind 100' also comprises two first detectors 60*a*', 60*b*' corresponding to the front pull cords 22 on the left and right sides and two second detectors 70*a*', 70*b*' corresponding to the rear pull cords 24 on the left and right sides, each of which is electrically connected to the controller 51 and comprises a tension sensor with computational capability. Except for this, the motorized venetian blind 100' has the same components and structure as the motorized venetian blind 100 in FIG. 1, so will not be redundantly described herein.

Figure 15:
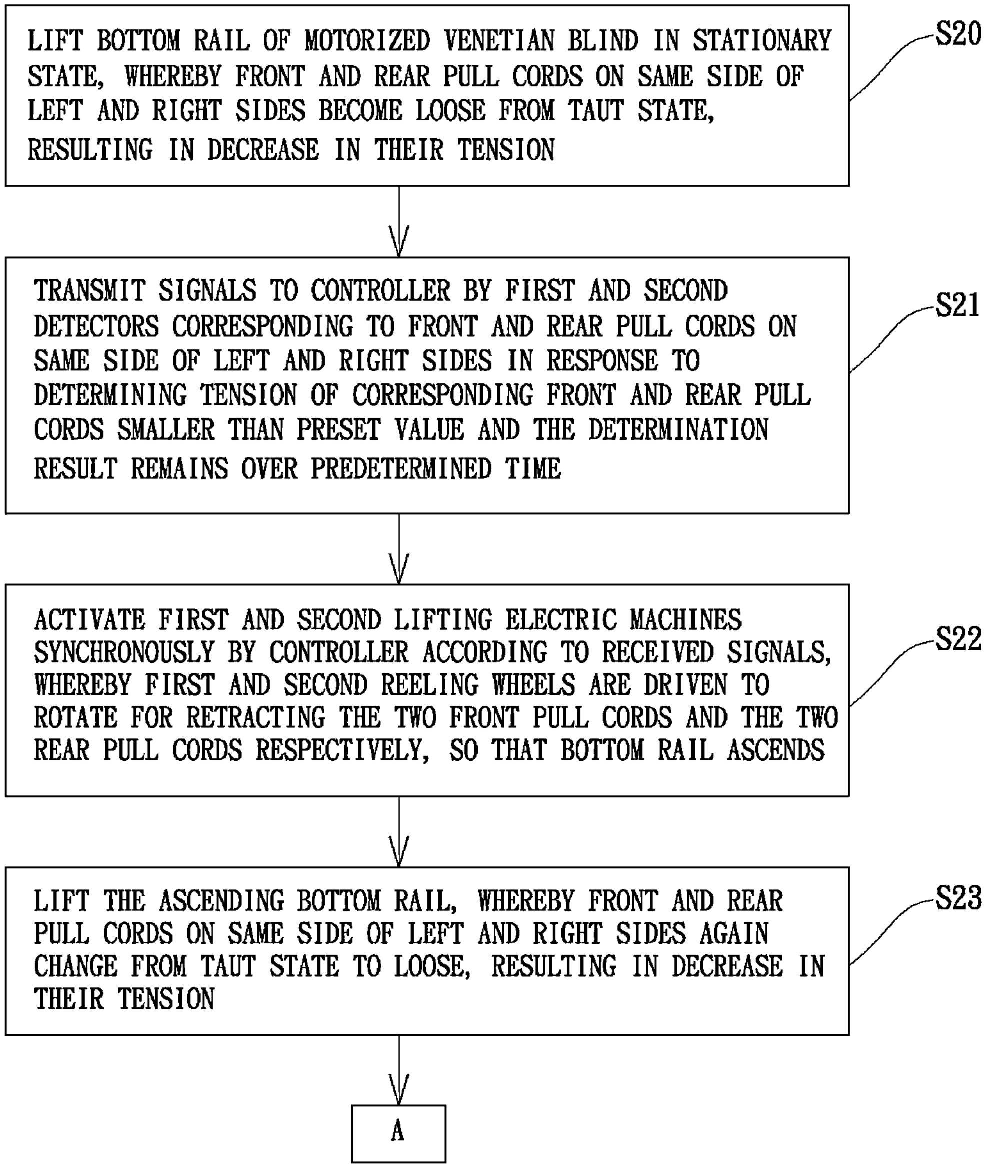
FIG. 15 and FIG. 15A collectively show a flow diagram of one embodiment of an operation method of the motorized venetian blind in FIG. 14.
Figure 15A:
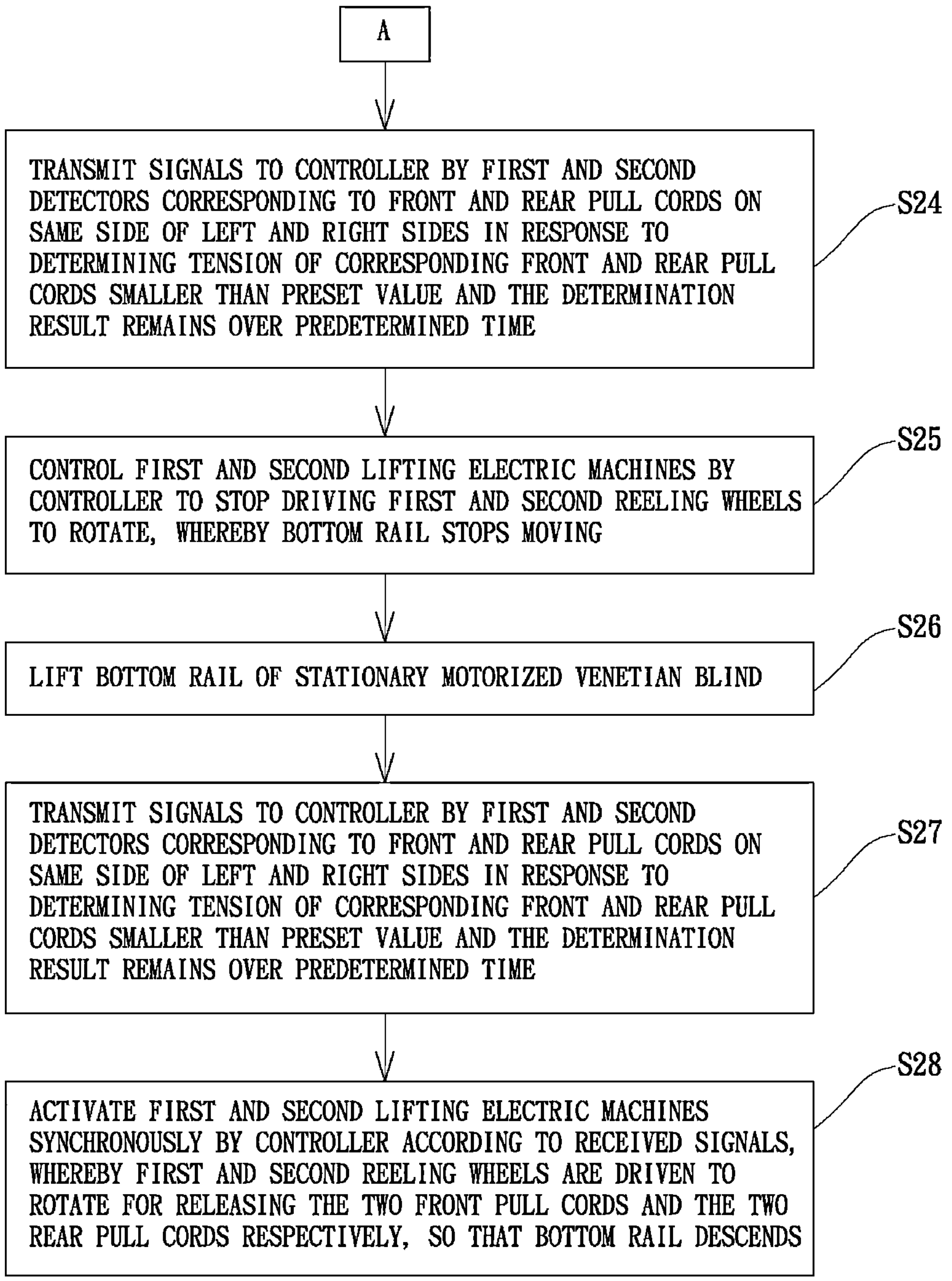

Please refer to FIG. 15 and FIG. 15A, which collectively show a flow diagram of one embodiment of an operation method of the motorized venetian blind 100' in FIG. 14. Firstly, at step S20, the user operates the motorized venetian blind 100' by lifting its bottom rail 20 with the hands as the motorized venetian blind 100' is in the stationary state. Since the user does not align with the center of the bottom rail 20 on purpose while lifting the bottom rail 20, the position where the user applies the force and the magnitude of the force change the front pull cord 22 and the rear pull cord 24 on a same side of the left and the right sides from the taut state to loose, causing decrease in their tension. For instance, if the position where the user applies the force bias towards the left side of the bottom rail 20, the front pull cord 22 and the rear pull cord 24 on the left side will exhibit loosening from the taut state earlier than the front pull cord 22 and the rear pull cord 24 on the right side. Concurrently, at step S21, the first detector 60*a*' detects decrease in tension of the front pull cord 22 on the left side, and determines a tension value of the front pull cord 22 on the left side smaller than a preset value. After this determination result has been maintained over predetermined time, e.g., 0.5 second, the first detector 60*a*' transmits a signal to the controller 51. Almost simultaneously, the second detector 70*a*' also detects decrease in tension of the rear pull cord 24 on the left side, and determines a tension value of the rear pull cord 24 on the left side smaller than the preset value. After this determination result has been maintained over the predetermined time, the second detector 70*a*' transmits a signal to the controller 51.

At step S21, if the position where the user applies the force bias towards the right side of the bottom rail 20 in the previous step S20, the other set of the first detector 60*b*' and the second detector 70*b*' each transmit a signal to the controller 51 after detecting and determining that the tension values of the front pull cord 22 and the rear pull cord 24 located on the right side keep being smaller than the preset value over the predetermined time, respectively. In this embodiment, whichever of the two aforesaid situations occurs, the subsequent steps will remain the same.

Subsequently, at step S22, after the controller 51 receives the signals from the first detector 60*a*' and the second detector 70*a*' at the same time, or receives the signals from the first detector 60*b*' and the second detector 70*b*' at the same time, the controller 51 activates the first lifting electric machine 54 and the second lifting electric machine 56 concurrently. Therefore, the first reeling wheel 44 and the second reeling wheel 46 are driven to rotate forwardly for retracting the two front pull cords 22 and the two rear pull cords 24, so that the bottom rail 20 ascends. At step S23, when the user determines that the bottom rail 20 is about to reach a desired height, the user lifts the bottom rail 20 with the hands again while the bottom rail 20 is ascending. In the process of lifting the bottom rail 20, the position where the user applies the force and the magnitude of the force change the front pull cord 22 and the rear pull cord 24 on the same side of the left and right sides from taut to loose, resulting in decrease in their tension.

Thereafter, at step S24, if the position where the user applies the force to the bottom rail 20 bias towards the left side in the previous step S23, the first detector 60*a*' and the second detector 70*a*' correspondingly detect and determine the tension values of the front pull cord 22 and the rear pull cord 24 on the left side smaller than the preset value, and each transmit a signal to the controller 51 after the determination result has been maintained over the predetermined time. Oppositely, if the position where the user's hands apply the force to the bottom rail 20 bias towards the right side in the previous step S23, the other set of the first detector 60*b*' and the second detector 70*b*' correspondingly detect and determine the tension values of the front pull cord 22 and the rear pull cord 24 on the right side smaller than the preset value, and each transmit a signal to the controller 51 after the determination result has been maintained over the predetermined time. In this embodiment, whichever of the two aforesaid situations occurs, the subsequent steps will remain the same.

Referring to FIG. 15A, at step S25, after the controller 51 receives the signals from the first detector 60*a*' and the second detector 70*a*' at the same time, or receives the signals from the first detector 60*b*' and the second detector 70*b*' at the same time, the controller 51 controls the first lifting electric machine 54 and the second lifting electric machine 56 to stop the rotation of the first reeling wheel 44 and the second reeling wheel 46, respectively. Thus, the bottom rail 20 stops moving, and the motorized venetian blind 100' turns to a stationary state. At step S26, the user operates the motorized venetian blind 100' by lifting its bottom rail 20 with the hands for the third time as the motorized venetian blind 100' is in the stationary state. In the process of lifting the bottom rail 20, the position where the user applies the force and the magnitude of the force change the front pull cord 22 and the rear pull cord 24 on the same side of the left and right sides from taut to loose, resulting in decrease in their tension.

Subsequently, at step S27, if the position on the bottom rail 20 where the user applies the force bias towards the left side in the previous step S26, the first detector 60*a*' and the second detector 70*a*' correspondingly detect and determine the tension values of the front pull cord 22 and the rear pull cord 24 on the left side smaller than the preset value, and each transmit a signal to the controller 51 after the determination result remains over the predetermined time. If the position on the bottom rail 20 where the user applies the force bias towards the right side in the previous step S26, the first detector 60*b*' and the second detector 70*b*' correspondingly detect and determine the tension values of the front pull cord 22 and the rear pull cord 24 on the right side smaller than the preset value, and each transmit a signal to the controller 51 after the determination result remains over the predetermined time. In this embodiment, whichever of the two aforesaid situations occurs, the subsequent steps will remain the same. At step S28, after the controller 51 receives the signals from the first detector 60*a*' and the second detector 70*a*' at the same time, or receives the signals from the first detector 60*b*' and the second detector 70*b*' at the same time, the controller 51 activates the first lifting electric machine 54 and the second lifting electric machine 56 concurrently to correspondingly drive the first reeling wheel 44 and the second reeling wheel 46 to rotate reversely, whereby the two front pull cords 22 and the two rear pull cords 24 are released for descending the bottom rail 20.

In the above-mentioned steps S22, S25 and S28, in response to one of the situation that the controller 51 receives the signals from the first detector 60*a*' and the second detector 70*a*' on the left side at the same time, and the situation that the controller 51 receives the signals from the first detector 60*b*' and the second detector 70*b*' on the right side at the same time, the controller 51 controls the bottom rail 20 to perform ascending, stopping and descending in sequence. In a further embodiment which will be illustrated below, in response to one of the situation that the controller 51 receives the signals from the first detector 60*a*' and the second detector 70*a*' on the left side at the same time, and the situation that the controller 51 receives the signals from the first detector 60*b*' and the second detector 70*b*' on the right side at the same time, the controller 51 shifts the action of the bottom rail 20 between ascending and descending.

Figure 16:
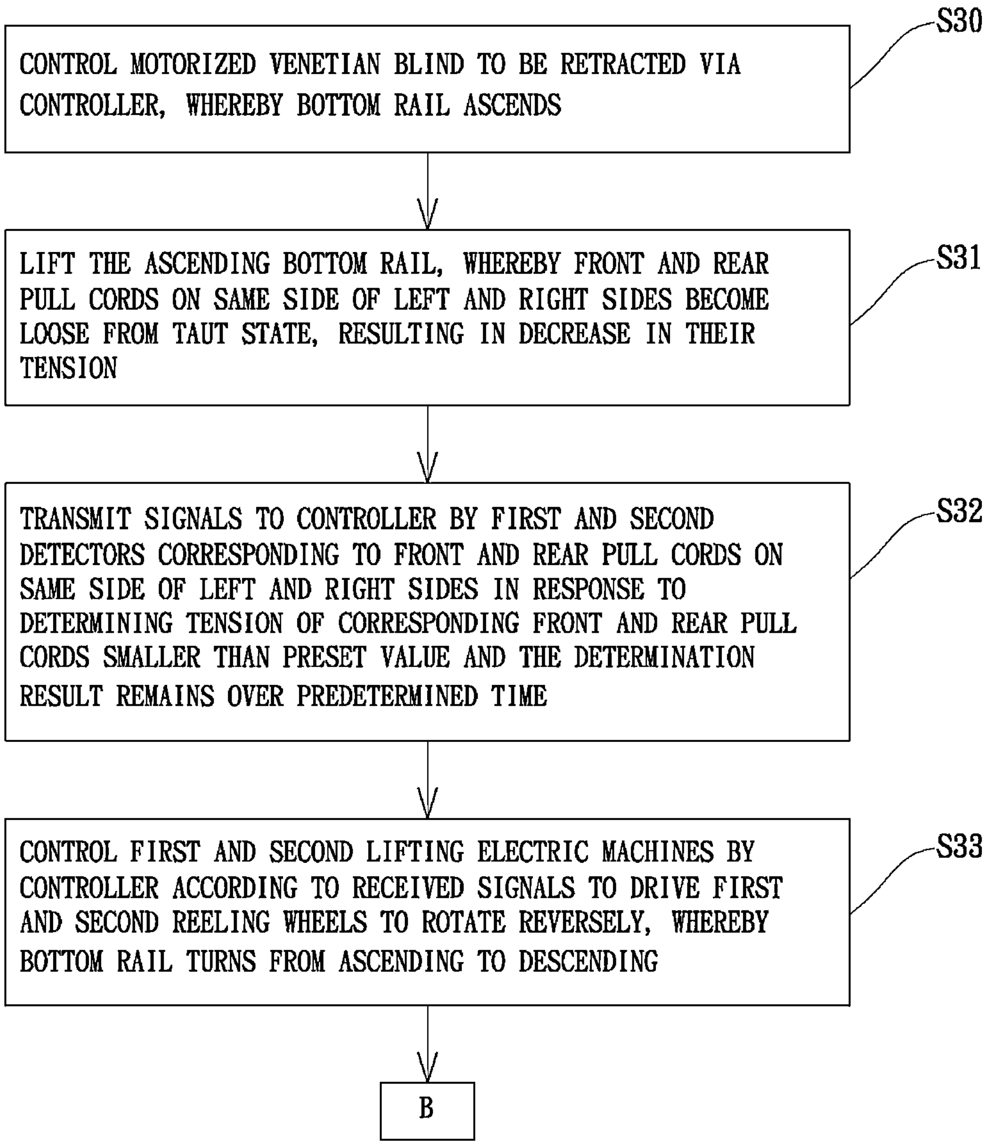
FIG. 16 and FIG. 16A collectively show a flow diagram of another embodiment of the operation method of the motorized venetian blind in FIG. 14.
Figure 16A:
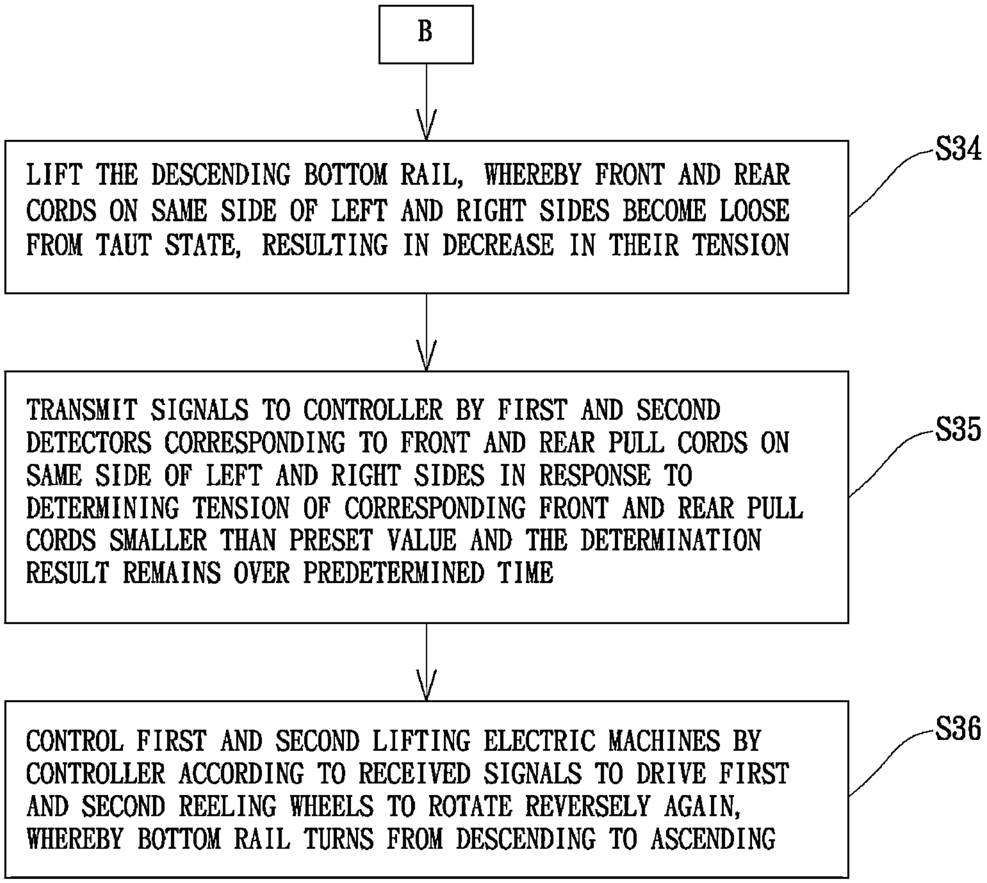

Please refer to FIG. 16 and FIG. 16A, which collectively show a flow diagram of another embodiment of the operation method of the motorized venetian blind 100' in FIG. 14. Firstly, at step S30, the user controls the motorized venetian blind 100' to retract via the controller 51, in which the bottom rail 20 is moved upwardly towards the upper limit position T1. At step S31, the user operates the motorized venetian blind 100' by supporting and lifting its bottom rail 20 with the hands as the motorized venetian blind 100' retracts. In the process of lifting the bottom rail 20, the position where the user applies the force and the magnitude of the force change the front pull cord 22 and the rear pull cord 24 on the same side of the left and right sides from taut to the loose, resulting in decrease in their tension.

At step S32, if the position on the bottom rail 20 where the user applies the force bias towards the left side in the previous step S31, almost simultaneously, the first detector 60*a*' and the second detector 70*a*' correspondingly detect and determine the tension values of the front pull cord 22 and rear pull cord 24 on the left side smaller than the preset value, and each transmit a signal to the controller 51 after the determination result remains over predetermined time, e.g., 0.5 second. If the position on the bottom rail 20 where the user applies the force bias towards the right side in the previous step S31, the other set of the first detector 60*b*' and the second detector 70*b*' correspondingly detect and determine the tension values of the front pull cord 22 and rear pull cord 24 on the right side smaller than the preset value, and each transmit a signal to the controller 51 after the determination result remains over the predetermined time. In this embodiment, whichever of the two aforesaid situations occurs, the subsequent steps will remain the same.

Afterwards, at step S33, after the controller 51 receives the signals from the first detector 60*a*' and the second detector 70*a*' at the same time, or after the controller 51 receives the signals from the first detector 60*b*' and the second detector 70*b*' at the same time, the controller 51 activates the first lifting electric machine 54 and the second lifting electric machine 56 concurrently to correspondingly change the rotation directions of the first reeling wheel 44 and the second reeling wheel 46. Thereby, the first reeling wheel 44 and the second reeling wheel 46 rotate in the directions opposite to their previous rotation directions. That is, a motion state of the first reeling wheel 44 and a motion state of the second reeling wheel 46 are both shifted from the forward rotation to the reverse rotation. As a result, the two front pull cords 22 and the two rear pull cords 24 are released, and the movement of the bottom rail 20 is changed from ascending to descending.

Thereafter, at step S34, the user operates the motorized venetian blind 100' by lifting its bottom rail 20 with the hands as the motorized venetian blind 100' extends and the bottom rail 20 descends. During the user lifts the bottom rail 20, the bottom rail 20 roughly stays level, and the position on the bottom rail 20 where the user applies the force and the magnitude of the force change the front pull cord 22 and the rear pull cord 24 on a same side of the left and right sides from taut to loose, resulting in decrease in their tension. At step S35, if the position on the bottom rail 20 where the user applies the force bias towards the left side in the previous step S34, the first detector 60*a*' and the second detector 70*a*' correspondingly detect and determine the tension values of the front pull cord 22 and the rear pull cord 24 on the left side smaller than the preset value, and each transmit a signal to the controller 51 after the determination result remains over the predetermined time. Oppositely, if the position on the bottom rail 20 where the user applies the force bias towards the right side in the previous step S34, the other set of the first detector 60*b*' and the second detector 70*b*' correspondingly detect and determine the tension values of the front pull cord 22 and the rear pull cord 24 on the right side smaller than the preset value, and each transmit a signal to the controller 51 after the determination result remains over the predetermined time. In this embodiment, whichever of the two aforesaid situations occurs, the subsequent steps will remain the same.

At step S36, after the controller 51 receives the signals from the first detector 60*a*' and the second detector 70*a*' at the same time, or receives the signals from the first detector 60*b*' and the second detector 70*b*' at the same time, the controller 51 activates the first lifting electric machine 54 and the second lifting electric machine 56 concurrently to correspondingly change the rotation directions of the first reeling wheel 44 and the second reeling wheel 46. Thereby, the first reeling wheel 44 and the second reeling wheel 46 rotate in the directions opposite to their previous rotation directions. That is, the motion state of the first reeling wheel 44 and the motion state of the second reeling wheel 46 are both shifted from the reverse rotation to the forward rotation. As a result, the two front pull cords 22 and the two rear pull cords 24 are retracted, and the movement of the bottom rail 20 is changed from descending to ascending. The bottom rail 20 will ascend until reaching the upper limit position T1.

The operation methods of the motorized venetian blind of the present disclosure are not limited to the above-mentioned exemplified operation methods. With the cooperation of the first detectors 60*a*', 60*b*', the second detectors 70*a*', 70*b*', and the controller 51, a variety of operation modes can be further designed depending on demands. For instance, several specified conditions may be set, and under those conditions, the controller 51 may transmit various commands to the first lifting electric machine 54 and the second lifting electric machine 56 for controlling the bottom rail 20 of the motorized venetian blind 100' to ascend, descend, stop moving, or move to a specified position, thereby changing a covered range of the slats 30 between the headrail 10 and the bottom rail 20. The aforesaid conditions may be a specified number of times that the bottom rail 20 is lifted (i.e., the number of times the front pull cord 22 and the rear pull cord 24 on a same side of the left and right sides become loose), hold-up time during which the bottom rail 20 is lifted (i.e., the duration of time starting from when the front pull cord 22 and the rear pull cord 24 on a same side of the left and right sides become loose and remain loose), and delay time after the bottom rail 20 is lifted (i.e., the duration of time staring from detecting the front pull cord 22 and the rear pull cord 24 on a same side of the left and right sides becoming loose to actually controlling the electric machines).

In addition, when the controller 51 concurrently receives the signals transmitted from the first detectors 60*a*', 60*b*' corresponding to the two front pull cords 22 on the left and right sides and detecting decrease in tension of the front pull cords 22, or concurrently receives the signals transmitted from the second detectors 70*a*', 70*b*' corresponding to the two rear pull cords 24 on the left and right sides and detecting decrease in tension of the rear pull cords 24, the controller 51 drives the tilting electric machine 58 to bring the tilting wheel 48 to rotate in a specified direction for tilting the slats 30. Thereby, the amount of light passing through the gaps between the slats 30 is adjusted. The detailed illustration can be found in the following two embodiments.

Figure 17:
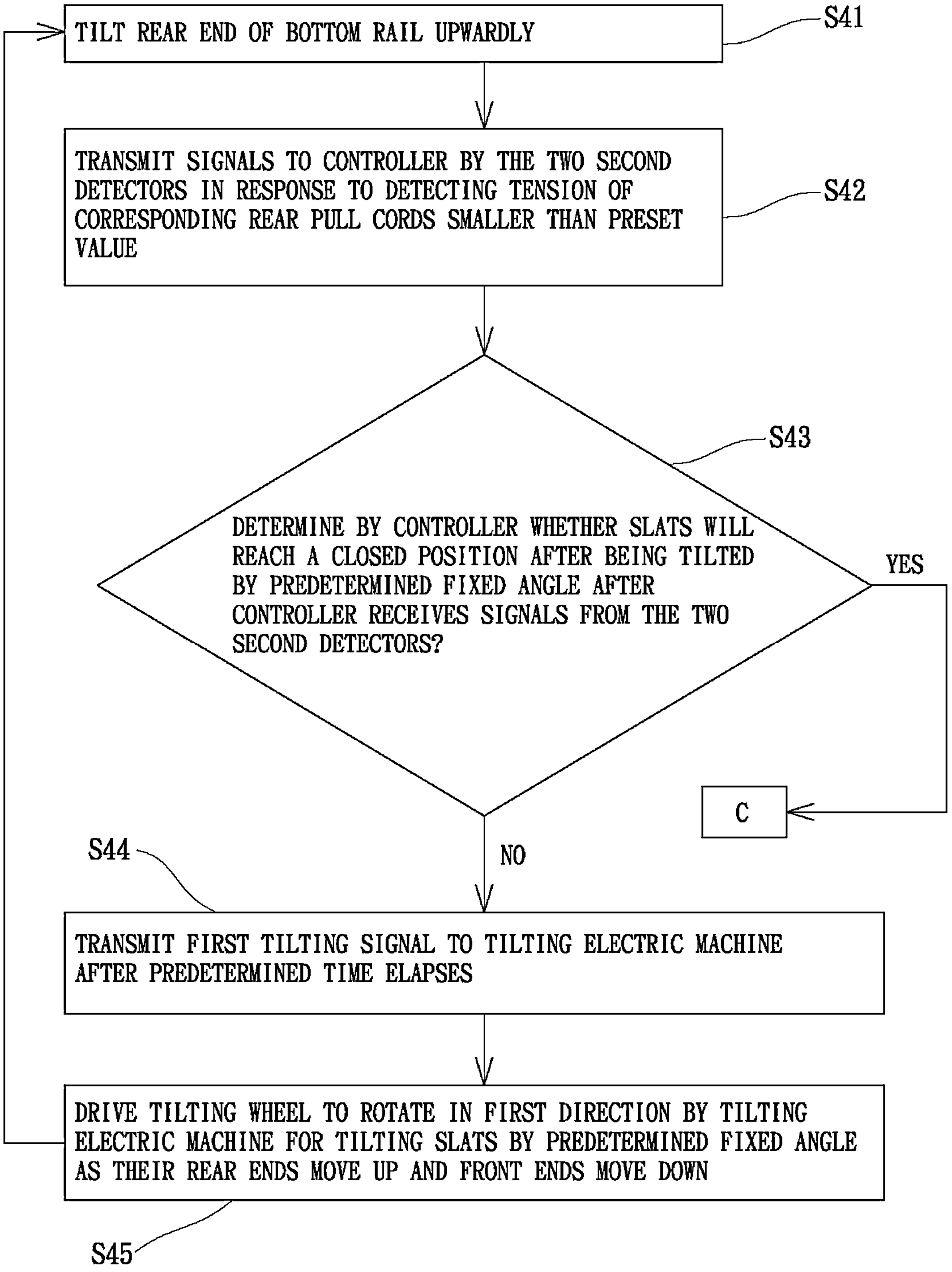
FIG. 17 and FIG. 17A collectively show a flow diagram of still another embodiment of the operation method of the motorized venetian blind in FIG. 14.
Figure 17A:
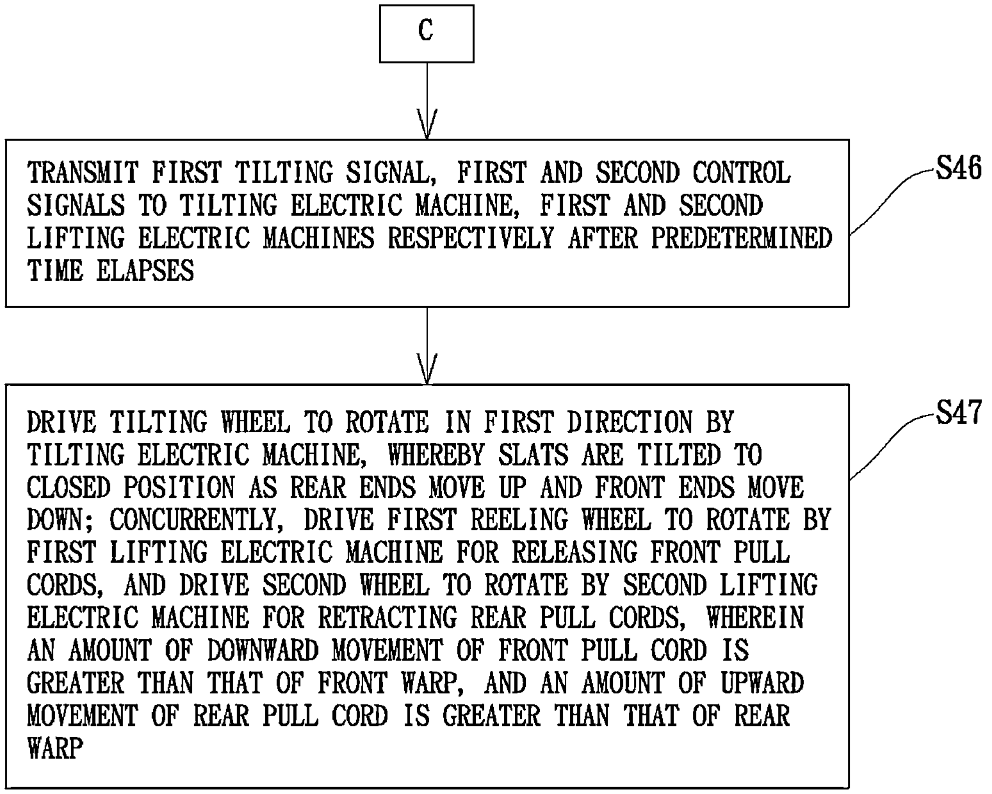

Please refer to FIG. 17 and FIG. 17A, which collectively show a flow diagram of still another embodiment of the operation method of the motorized venetian blind 100' in FIG. 14. In the present embodiment, the user can control the slats 30 to tilt by a predetermined fixed angle each time. The predetermined fixed angle can be but not limited to 30° or 40°. Moreover, in a special tilting step where the slats 30 are going to be tilted to the closed state, the motorized venetian blind 100' automatically controls the pull cords to cooperate with the movement of the warps, thereby ensuring that the bottom rail 20 effectively closes with the neighboring slat 30.

In the present embodiment, firstly, at step S41, the user tilts the rear end of the bottom rail 20, whereby the front end of the bottom rail 20 is tilted correspondingly towards the downward direction. Concurrently, the front pull cords 22 on the left and right sides of the motorized venetian blind 100' remain in the taut state as the tension thereof remains in a predetermined range, while the rear pull cords 24 on the left and right sides turn loose as their tension decreases. At step S42, the second detectors 70*a*', 70*b*' corresponding to the rear pull cords 24 detect the tension of the two rear pull cords 24 smaller than a preset value and each consequently transmit a signal to the controller 51. At step S43, after the controller 51 receives the signals from the second detectors 70*a*', 70*b*' at the same time, the controller 51 determines whether the slats 30 will reach the closed position after being tilted by the predetermined fixed angle. If not, enter the step S44.

At step S44, the controller 51 transmits a first tilting signal to the tilting electric machine 58 after predetermined time (e.g., 0.5 second) elapses. Following that, at step S45, the tilting wheel 58 receives the first tilting signal and accordingly drives the tilting wheel 48 to rotate in a first direction, whereby each pair of the front warp 32*a* and the rear warp 32*b* on the left and right sides is driven to move in the opposite directions to be up-and-down dislocated, bringing the slats 30 to be tilted by the predetermined fixed angle, in a direction that the rear end of each slat 30 moves upward while the front end moves downward. Thereafter, the user can optionally choose to return to the step S41, tilting the rear side of the bottom rail 20 upwardly again with the intention of continuing adjusting the tilting angle of the slats 30.

Oppositely, if the controller 51 determines that the slats 30 will reach the closed position after being tilted by the predetermined fixed angle in the step S43, enter the step S46. At step S46, after the predetermined time elapses, the controller 51 transmits a first tilting signal to the tilting electric machine 58, and concurrently transmits a first control signal and a second control signal to the first lifting electric machine 54 and a second lifting electric machine 56, respectively. Subsequently, at step S47, the tilting electric machine 58 receives the first tilting signal and accordingly drives the tilting wheel 48 to rotate in the first direction. Thereby, each pair of the front warp 32*a* and the rear warp 32*b* on the left and right sides is driven to move in the opposite directions to be dislocated vertically, bringing the slats 30 to be tilted by the predetermined fixed angle in a direction where the rear end of each slat 30 moves upward while the front end of each slat 30 moves downward until reaching the closed state shown in FIG. 6.

Meanwhile, at step S47, the first lifting electric machine 54 receives the first control signal and accordingly drives the first reeling wheel 44 to rotate, so that the front pull cords 22 on both the left and right sides are released. The amounts of the downward movements of the front pull cords 22 on both the left and right sides are the same, and are at least equal to and preferably greater than the amounts of the downward movements of the front warps 32*a* on both the left and right sides. Therefore, the bottom rail 20 is prevented from not being able to fully tilt along with the descent of the front warp 32*a* due to restriction by the length of the front pull cord 22.

Meanwhile, at step S47, the second lifting electric machine 56 receives the second control signal and accordingly drives the second reeling wheel 46 to rotate, so that the rear pull cords 24 on both the left and right sides are retracted. The amounts of the upward movements of the rear pull cords 24 on both the left and right sides are the same, and are at least equal to and preferably greater than the amounts of the upward movements of the rear warps 32*b* on the left and right sides for entirely suspending the bottom rail 20 by the two rear pull cords 24, whereby the bottom rail 20 is forcibly tilted to a mostly vertical position, so that the light leakage problem caused by incomplete closure of the bottom rail 20 with the neighboring slat 30 can be improved.

The operation method of this embodiment can also be applied to the motorized venetian blind 100 in FIG. 1 as being implemented by the first detectors 60*a*, 60*b* and the second detectors 70*a*, 70*b* which are microswitches.

On the other hand, the user can also tilt the bottom rail 20 in the other direction to perform the similar operation. Please refer to FIG. 18, which shows a flow diagram of yet still another embodiment of the operation method of the motorized venetian blind 100' in FIG. 14. In the present embodiment, at step S51, the user tilts the front end of the bottom rail 20 towards the upward direction, whereby the rear end of the bottom rail 20 is tilted correspondingly towards the downward direction. Concurrently, the rear pull cords 24 on both the left and right sides of the motorized venetian blind 100' remain in the taut state as their tension remains in a predetermined range, while the front pull cords 22 on both the left and right sides turn loose and their tension decreases. At step S52, the first detectors 60*a*', 60*b*' corresponding to the two front pull cords 22, respectively determine whether the tension of the corresponding front pull cords 22 on the left and right sides smaller than a preset value? If so, enter the next step S53, in which the first detectors 60*a*', 60*b*' each transmit a signal to the controller 51 after predetermined time (e.g., 0.5 second) elapses following the completion of the determination.

Afterwards, at step S54, after receiving the two signals at the same time, the controller 51 transmits a second tilting signal to the tilting electric machine 58. Meanwhile, the controller 51 also transmits a first control signal and a second control signal to the first lifting electric machine 54 and the second lifting electric machine 56, respectively. At step S55, the tilting electric machine 58 receives the second tilting signal and accordingly drives the tilting wheel 48 to rotate in a second direction. Thereby, the front warp 32*a* and the rear warp 32*b* on each of the left and right sides move in the opposite directions to be dislocated vertically, bringing the slats 30 to be tilted in a direction where the front end of each slat 30 moves upward while the rear end of each slat 30 moves downward until reaching the closed position shown in FIG. 8. Moreover, at step S55, the first lifting electric machine 54 receives the first control signal and accordingly drives the first reeling wheel 44 to rotate, so that the front pull cords 22 on both the left and right sides are retracted. The amounts of the upward movements of the front pull cords 22 on both the left and right sides are the same, and are at least equal to and preferably greater than the amounts of the upward movements of the front warps 32*a* on the left and right sides for entirely suspending the bottom rail 20 by the two front pull cords 22, whereby the bottom rail 20 is forcibly tilted to a mostly vertical position, so that the light leakage problem caused by incomplete closure of the bottom rail 20 with the neighboring slat 30 can be improved.

Meanwhile, at step S55, the second lifting electric machine 56 receives the second control signal and accordingly drives the second reeling wheel 46 to rotate, so that the rear pull cords 24 on both the left and right sides are released. The amounts of the downward movements of the rear pull cords 24 on both the left and right sides are the same, and are greater than the amounts of the downward movements of the rear warps 32*b* on both the left and right sides. Therefore, the bottom rail 20 is prevented from not being able to fully tilt along with the descent of the rear warp 32*b* due to restriction by the length of the rear pull cords 24.

The operation methods of the motorized venetian blind of the present disclosure are not limited to the above-mentioned examples. With the cooperation of the first detectors 60*a*', 60*b*', the second detectors 70*a*', 70*b*', and the controller 51, a variety of operation modes can be further designed depending on demands. For instance, several specified conditions may be set, and under those conditions, the controller 51 may transmit various commands to the tiling electric machine 58, the first lifting electric machine 54 and/or the second lifting electric machine 56 for controlling the motorized venetian blind 100' to tilt the slats 30, and controlling the front pull cords 22 on both the left and right sides or the rear pull cords 24 on both the left and right sides to be retracted or released, at a special tilting step in which the slats 30 are going to be tilted to the closed state from a non-closed position, thereby ensuring that the bottom rail 20 effectively closes with the neighboring slat 30. The aforesaid conditions may be a specified tilting angle of the bottom rail 20, a specified period of time during which the bottom rail 20 is being tilted (i.e., the duration of time in which the front pull cords 22 on the left and right sides both become loose and remain loose, or the duration of time in which the rear pull cords 24 on the left and right sides both become loose and remain loose), and specified delay time after the bottom rail 20 is tilted (i.e., the duration from detecting the front pull cords 22 on both the left and right sides or the rear pull cords 24 on both the left and right sides becoming loose, to actually controlling the electric machines).

Figure 18:
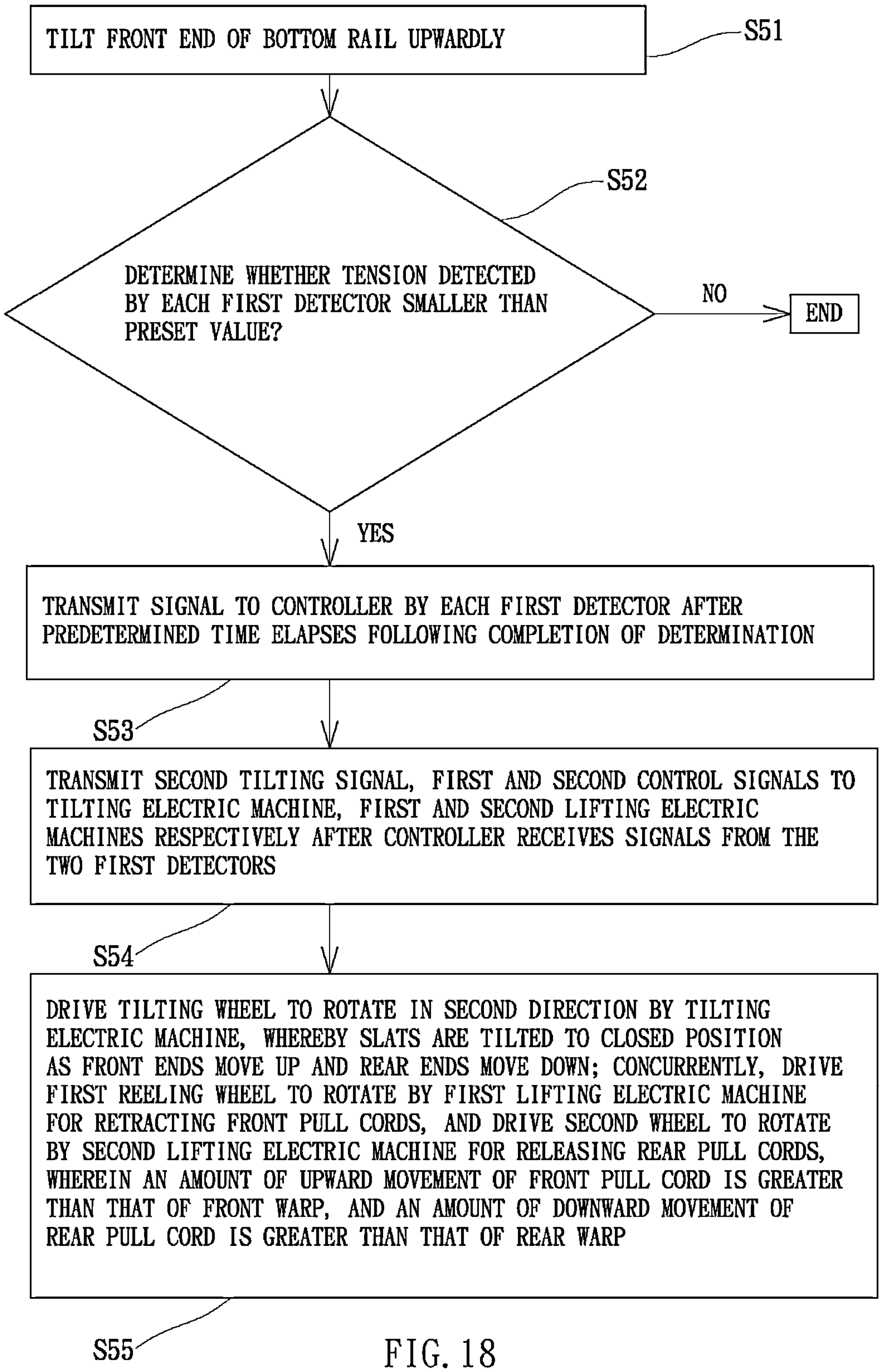
FIG. 18 is a flow diagram of yet another embodiment of the operation method of the motorized venetian blind in FIG. 14.

The way of controlling the tilt of the slats 30, as exemplified by the embodiment shown in FIG. 18, can be tilting the slats 30 from the horizontal position P1 to the closed position P2 or P2', or oppositely, tilting the slats 30 from the closed position P2 or P2' to the horizontal position P1. Apart from that, as exemplified by the embodiment shown in FIG. 17, the rotational travel of each slat 30 between the horizontal position P1 and the closed position P2 or P2' can be divided into several segments to be proceeded sequentially.

During each segment of the rotational travel, the slats 30 are tilted by approximately the same angle. Furthermore, in some other embodiments, the first detectors 60*a*', 60*b*' as well as the second detectors 70*a*', 70*b*' are implemented by the detectors with higher measurement accuracy for detecting data of the tension of the corresponding pull cords, and the controller 51 is made to tilt the slats 30 correspondingly to the detected data, whereby the slats 30 are tilted to an intermediate position between the horizontal position P1 and the closed position P2 or P2', in which the tilting angle of the slats 30 exhibits a positive correlation proportional relationship with the angle by which the bottom rail 20 is tilted. Thus, the amount of light passing through the motorized venetian blind 100' can be tune with finer adjustments.

Figure 4:
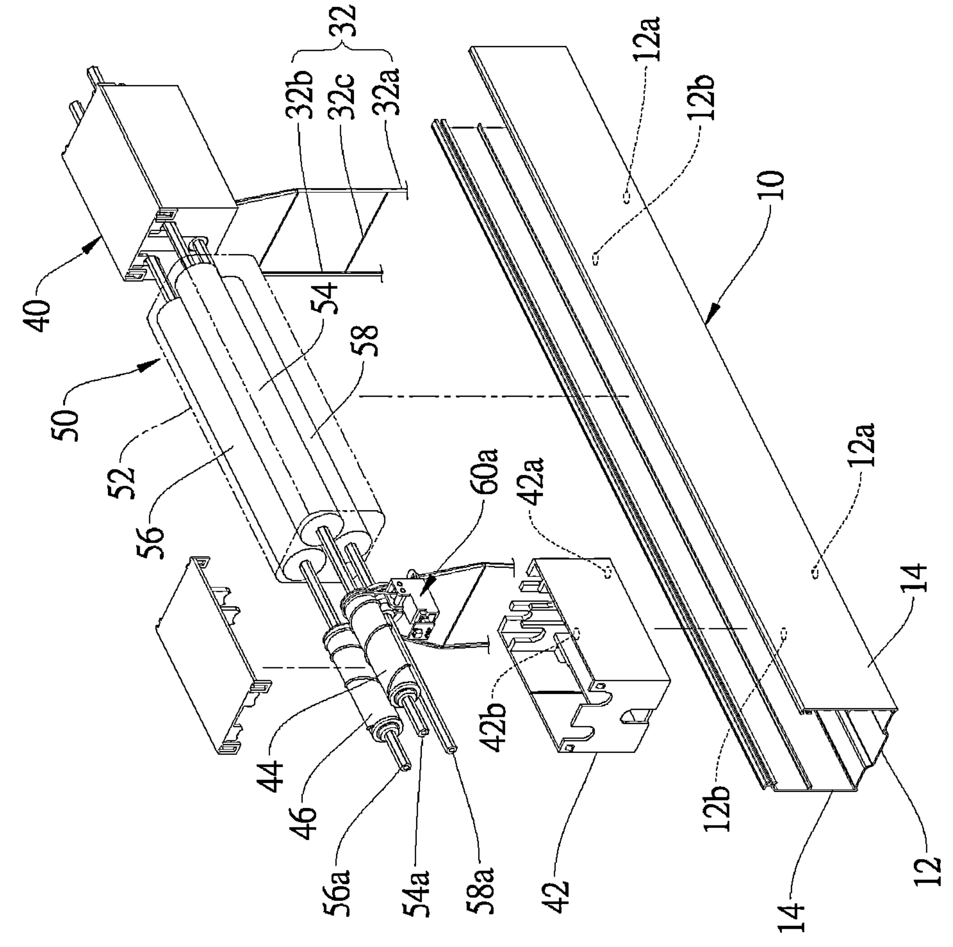
FIG. 4 schematically shows the cord control units and the electric machine unit of the motorized venetian blind in FIG. 1.

In addition, the motorized venetian blind of the present disclosure is not limited to being equipped with the electric machine unit 50 and the cord control units 40 shown in FIG. 4. The first lifting electric machine, the second electric lifting machine and the tilting electric machine, as well as the retracting devices of the pull cords and the warps, may be disposed in different relative positions in the headrail as long as remaining their electrically connecting relationship shown in FIG. 9.

Figure 19:
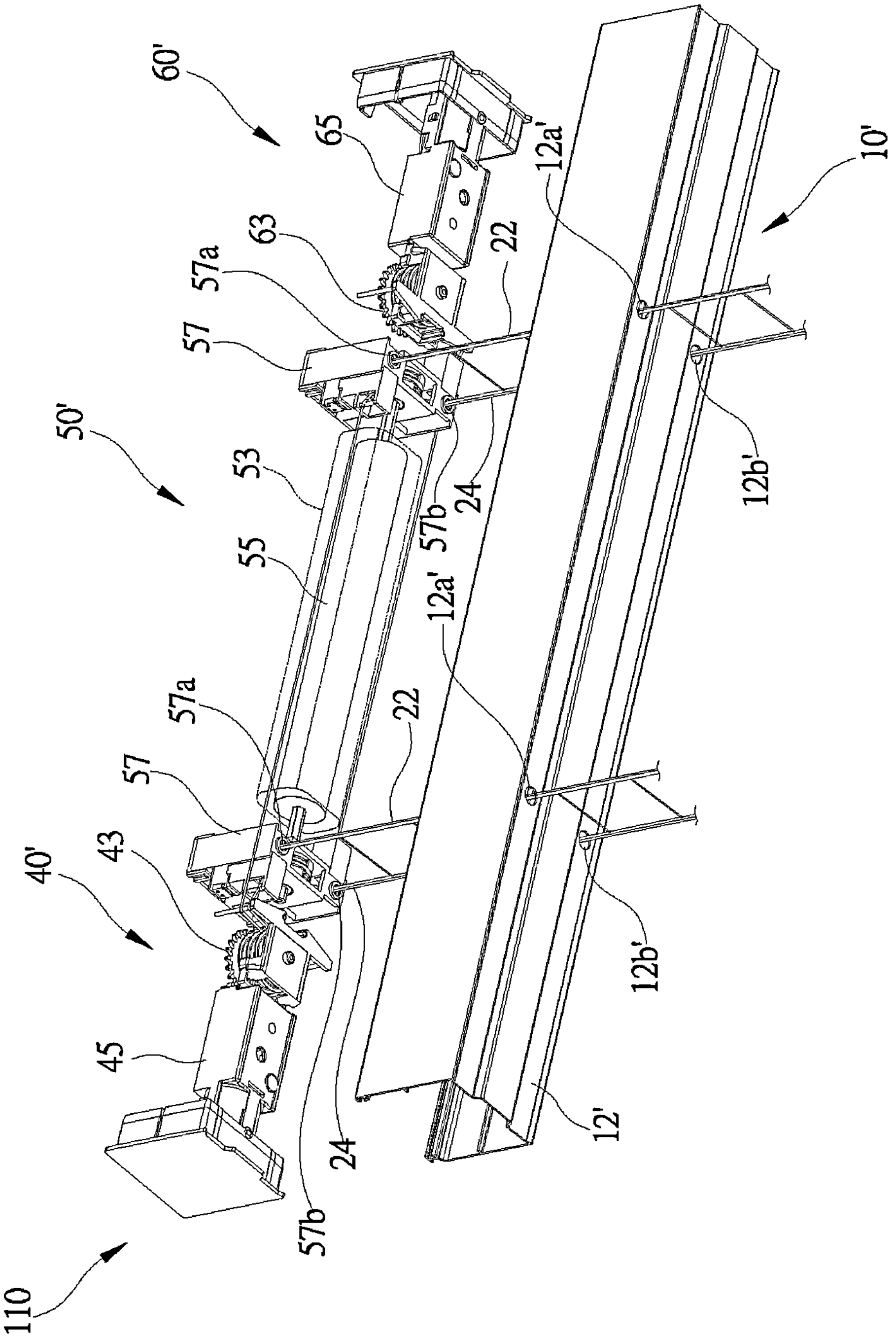
FIG. 19 is a partial exploded view of the motorized venetian blind, according to another embodiment of the present disclosure.
Figure 20:
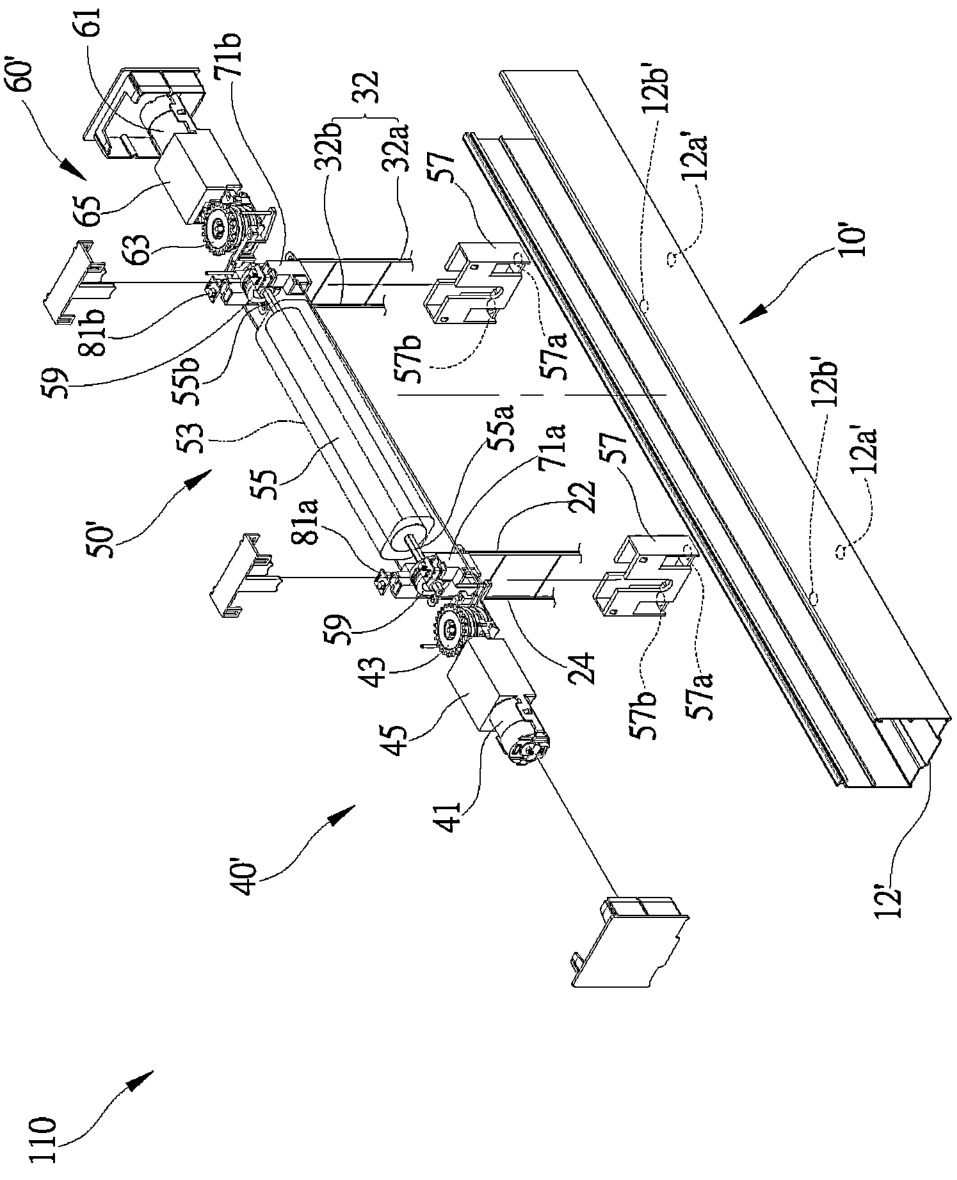
FIG. 20 is a partial exploded view of the motorized venetian blind in FIG. 19 viewed from another angle.

Please refer to FIG. 19 and FIG. 20. In a further embodiment of the present disclosure, the motorized venetian blind 110 further comprises a front-pull-cord electromechanical control unit 40', a ladder-cord electromechanical control unit 50' and a rear-pull-cord electromechanical control unit 60' in addition to a headrail 10', a bottom rail (not shown) and plural slats (not shown). The front-pull-cord electromechanical control unit 40', the ladder-cord electromechanical control unit 50' and the rear-pull-cord electromechanical control unit 60' are disposed within the headrail 10', as the ladder-cord electromechanical control unit 50' is located between the front-pull-cord electromechanical control unit 40' and the rear-pull-cord electromechanical control unit 60'. The headrail 10' has two pairs of cord holes 12*a*', 12*b*' located on the left and right sides thereof. Each pair of cord holes 12*a*', 12*b*' is in front-and-rear configuration, penetrating through a top surface and a bottom surface of a bottom plate 12'.

Keep referring to FIG. 19 and FIG. 20. The front-pull-cord electromechanical control unit 40' comprises a first lifting electric machine 41 and a first reeling wheel 43. The first reeling wheel 43 is disposed upright, and the first lifting electric machine 41 and the first reeling wheel 43 are connected to each other through a gear transmission mechanism (only part of spur gear thereof meshed with a gear plate of the first reeling wheel 43 is shown) disposed in a first casing 45. One end of the front pull cord 22 on the right side is fixed to and wound up on the upper one of the two grooved rails of the first reeling wheel 43, while the other end thereof extends to the interior of a third casing 57 on the right side and passes downwardly through a via hole 57*a* thereof, then passing through a cord hole 12*a*' of the headrail 10' on the right side, finally fixing to the bottom rail (not shown). Meanwhile, one end of the front pull cord 22 on the left side is fixed to and wound up on the lower one of the two grooved rails of the first reeling wheel 43, while the other end extends to the interior of a third casing 57 on the left side and passes downwardly through a via hole 57*a* thereof, then passing through a cord hole 12*a*' of the headrail 10' on the left side, finally fixing to the bottom rail (not shown). Through the gear transmission mechanism, the first lifting electric machine 41 can drive the first reeling wheel 43 to rotate about a vertical axis, whereby the front pull cords 22 on the left and right sides are concurrently wound up, or are concurrently released.

Similarly, the rear-pull-cord electromechanical control unit 60' comprises a second lifting electric machine 61 and a second reeling wheel 63. The second reeling wheel 63 is disposed upright, and the second lifting electric machine 61 and the second reeling wheel 63 are connected to each other through a gear transmission mechanism (only part of spur gear thereof meshed with a gear plate of the second reeling wheel 63 is shown) disposed in a second casing 65. One end of the rear pull cord 24 on the left side is fixed to and wound up on the upper one of the two grooved rails of the second reeling wheel 63, while the other end thereof extends to the interior of a third casing 57 on the left side and passes downwardly through a via hole 57*b* thereof, then passing through a cord hole 12*b*' of the headrail 10' on the left side, finally fixing to the bottom rail (not shown). Meanwhile, one end of the rear pull cord 24 on the right side is fixed to and wound up on the lower one of the two grooved rails of the second reeling wheel 63, while the other end thereof extends to the interior of a third casing 57 on the right side and passes downwardly through a via hole 57*b* thereof, then passing through a cord hole 12*b*' of the headrail 10' on the right side, finally fixing to the bottom rail (not shown). Through the gear transmission mechanism, the second lifting electric machine 61 can drive the second reeling wheel 63 to rotate about a vertical axis, whereby the rear pull cords 24 on the left and right sides are concurrently wound up, or are concurrently released.

The ladder-cord electromechanical control unit 50' comprises a tilting electric machine 55 and two tilting wheels 59. The tilting electric machine 55 is disposed within a case 53. The two tilting wheels 59 are disposed within the third casings 57 on the left and right sides. The tilting electric machine 55 is used for driving two shafts 55*a* and 55*b* to rotate, in which the two shafts 55*a*, 55*b* penetrate through the two tilting wheels 59, respectively. When the shafts 55*a*, 55*b* are driven to rotate, they bring the two tilting wheels 59 to rotate concurrently. Thereby, for each ladder cord 32, one of the front warp 32*a* and the rear warp 32*b* is brought to move upwardly while the other one of the front warp 32*a* and the rear warp 32*b* is brought to move downwardly. Meanwhile, the motorized venetian blind 110 of the present embodiment further comprises two first detectors 71*a*, 71*b* corresponding to the front pull cords 22 on the left and right sides, and two second detectors 81*a*, 81*b* corresponding to the rear pull cords 24 on the left and right sides. The first detector 71*a* and the second detector 81*a* are disposed on the headrail 10' and in the vicinity of the third casing 57 on the left side, while the first detector 71*b* and the second detector 81*b* are disposed on the headrail 10' and in the vicinity of the third casing 57 on the right side. With this configuration, all the operation methods those can be applied to the motorized venetian blind 100 also can be applied to the motorized venetian blind 110 of the present embodiment.

In conclusion, the motorized venetian blinds 100, 100' and 110 of the present disclosure utilize the first lifting electric machines 54, 41 and the second lifting electric machines 56, 61 to adjust the amounts of movements of the front pull cords 22 on the left and right sides and the rear pull cords 24 on the left and right sides, respectively, based on the size and shape of the bottom rails 20, collaborating with the actions of the tilting electric machines 55, 58 in retracting or releasing the front warps 32*a* and rear warps 32*b*, thereby making the bottom rails 20 extremely close to or abut against the neighboring slats 30 while the motorized venetian blinds 100, 100' and 110 are in the closed state to largely improve poor closure caused by the asynchronous movements of the pull cords and the warps in the art. Moreover, through disposing the detectors corresponding to each of the pull cords to detect change of tension of the pull cords, the motorized venetian blinds 100, 100' and 110 of the present disclosure can be operated by directly touching the bottom rails 20 thereof apart from being controlled via the controller 51, which delivers innovative and convenient user experiences to consumers.

The embodiments described above are only some exemplary embodiments of the present disclosure. All equivalent structures which employ the concepts disclosed in this specification and the appended claims should fall within the scope of the present disclosure.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A motorized venetian blind, comprising:

a headrail;

a bottom rail, situated below the headrail through a front pull cord and a rear pull cord which are respectively connected to a first reeling wheel and a second reeling wheel, wherein the first reeling wheel and the second reeling wheel are disposed on the headrail;

plural slats, suspended by a ladder cord and located between the headrail and the bottom rail, wherein the ladder cord comprises a front warp and a rear warp each have one end connected to a tilting wheel disposed on the headrail; the plural slats are located between the front warp and the rear warp; the front warp and the front pull cord pass one side of the slats, and the rear warp and the rear pull cord pass the other side of the slats;

a first lifting electric machine, configured to control the first reeling wheel to rotate for performing one of retracting the front pull cord and releasing the front pull cord;

a second lifting electric machine, configured to control the second reeling wheel to rotate for performing one of retracting the rear pull cord and releasing the rear pull cord; and a tilting electric machine, configured to control the tilting wheel to rotate for generating a relative movement that is substantially vertical of the front warp and the rear warp of the ladder cord, whereby the slats are tilted between a horizontal position and a closed position;

wherein when the front pull cord and the rear pull cord are concurrently retracted or when the front pull cord and the rear pull cord are concurrently released, the bottom rail is moved between an upper limit position and a lower limit position, wherein the upper limit position is close to the headrail and the lower limit position is distanced from the headrail; when one of the front warp and the rear warp is moved upwardly for tilting the slats from the horizontal position to the closed position, the front pull cord or the rear pull cord on a same side as the one of the front warp and the rear warp that is moved upwardly is also moved upwardly, making the bottom rail tilt towards a same direction as a tilting direction of the slats to a substantially vertical position and partially overlap an adjacent one of the slats.

2. The motorized venetian blind of claim 1, wherein the headrail has a datum surface, and the front pull cord, the rear pull cord, the front warp and the rear warp pass through the datum surface; if the front pull cord is the one of the front pull cord and the rear pull cord that is moved upwardly, an amount of upward movement with respect to the datum surface of the front pull cord is greater than an amount of upward movement with respect to the datum surface of the front warp; if the rear pull cord is the one of the front pull cord and the rear pull cord that is moved upwardly, an amount of upward movement with respect to the datum surface of the rear pull cord is greater than an amount of upward movement with respect to the datum surface of the rear warp.

3. The motorized venetian blind of claim 1, wherein the headrail has a datum surface, and the front pull cord, the rear pull cord, the front warp and the rear warp pass through the datum surface; if the front pull cord is the one of the front pull cord and the rear pull cord that is moved upwardly, an amount of upward movement with respect to the datum surface of the front pull cord is substantially equal to an amount of upward movement with respect to the datum surface of the front warp; if the rear pull cord is the one of the front pull cord and the rear pull cord that is moved upwardly, an amount of upward movement with respect to the datum surface of the rear pull cord is substantially equal to an amount of upward movement with respect to the datum surface of the rear warp.

4. The motorized venetian blind of claim 1, wherein the headrail has a datum surface, and the front pull cord, the rear pull cord, the front warp and the rear warp pass through the datum surface; if the front pull cord is the one of the front pull cord and the rear pull cord that is moved upwardly, an amount of upward movement with respect to the datum surface of the front pull cord is smaller than an amount of upward movement with respect to the datum surface of the front warp; if the rear pull cord is the one of the front pull cord and the rear pull cord that is moved upwardly, an amount of upward movement with respect to the datum surface of the rear pull cord is smaller than an amount of upward movement with respect to the datum surface of the rear warp.

5. The motorized venetian blind of claim 1, wherein the headrail has a datum surface, and the front pull cord, the rear pull cord, the front warp and the rear warp pass through the datum surface; when the slats are tilted from the horizontal position to the closed position, the other one of the front pull cord and the rear pull cord rather than the one of the front pull cord and the rear pull cord that is moved upwardly is moved downwardly; if the front pull cord is the one moved downwardly, an amount of downward movement with respect to the datum surface of the front pull cord is substantially equal to an amount of downward movement with respect to the datum surface of the front warp; if the rear pull cord is the one that is moved downwardly, an amount of downward movement with respect to the datum surface of the rear pull cord is substantially equal to than an amount of downward movement with respect to the datum surface of the rear warp.

6. The motorized venetian blind of claim 1, further comprising:

a first detector, configured to detect tension of the front pull cord; and a second detector, configured to detect tension of the rear pull cord.

7. The motorized venetian blind of claim 6, wherein when at least one of the first detector and the second detector detects tension smaller than a preset value while the first lifting electric machine and the second lifting electric machine are driving the first reeling wheel and the second reeling wheel to rotate respectively, a first control signal and a second control signal are transmitted to the first lifting electric machine and the second lifting electric machine respectively, whereby the first lifting electric machine and the second lifting electric machine stop controlling the first reeling wheel and the second reeling wheel to rotate respectively.

8. The motorized venetian blind of claim 6, wherein when the first detector and the second detector both detect tension smaller than a preset value while the first reeling wheel and the second reeling wheel are stationary, a first control signal and a second control signal are transmitted to the first lifting electric machine and the second lifting electric machine respectively, whereby the first lifting electric machine and the second lifting electric machine control the first reeling wheel and the second reeling wheel to rotate respectively for concurrently retracting the front pull cord and the rear pull cord, or concurrently releasing the front pull cord and the rear pull cord.

9. The motorized venetian blind of claim 6, wherein a first tilting signal is transmitted in response to only the second detector between the first detector and the second detector detecting tension smaller than a preset value, whereby the tilting electric machine controls the tilting wheel to rotate in a first direction for releasing the front warp and retracting the rear warp; a second tilting signal is transmitted in response to only the first detector between the first detector and the second detector detecting tension smaller than the preset value, whereby the tilting electric machine controls the tilting wheel to rotate in a second direction for retracting the front warp and releasing the rear warp.

10. The motorized venetian blind of claim 6, wherein the first detector and the second detector are disposed on the headrail as the front pull cord passes the first detector after extending out from the first reeling wheel, and the rear pull cord passes the second detector after extending out from the second reeling wheel.

11. A motorized venetian blind, comprising:

a headrail;

a bottom rail, situated below the headrail through a front pull cord and a rear pull cord which are respectively connected to a first reeling wheel and a second reeling wheel, wherein the first reeling wheel and the second reeling wheel are disposed on the headrail;

plural slats, suspended by a ladder cord and located between the headrail and the bottom rail, wherein the ladder cord comprises a front warp and a rear warp each have one end connected to a tilting wheel disposed on the headrail; the slats are located between the front warp and the rear warp;

the front warp and the front pull cord pass one side of the slats, and the rear warp and the rear pull cord pass the other side of the slats;

a first lifting electric machine, configured to control the first reeling wheel to rotate for performing one of retracting the front pull cord and releasing the front pull cord;

a second lifting electric machine, configured to control the second reeling wheel to rotate for retracting the rear pull cord and releasing the rear pull cord;

a tilting electric machine, configured to control the tilting wheel to rotate for generating a relative movement that is substantially vertical of the front warp and the rear warp of the ladder cord, whereby the slats are tilted between a horizontal position and a closed position;

a first detector, configured to detect tension of the front pull cord;

a second detector, configured to detect tension of the rear pull cord; and a controller, electrically connected to the first lifting electric machine, the second lifting electric machine and the tilting electric machine;

wherein the controller transmits a first tilting signal to make the tilting electric machine control the tilting wheel to rotate in a first direction in response to only the second detector between the first detector and the second detector detecting tension smaller than a preset value while the first reeling wheel and the second reeling wheel are stationary, whereby the rear warp is moved upwardly relative to the front warp to tilt the slats; the controller transmits a second tilting signal to make the tilting electric machine control the tilting wheel to rotate in a second direction in response to only the first detector between the first detector and the second detector detecting tension smaller than the preset value while the first reeling wheel and the second reeling wheel are stationary, whereby the front warp is moved upwardly relative to the rear warp to tilt the slats;

wherein either or both of the following situations occur: when the tilting electric machine controls the tilting wheel to tilt the slats to the closed position in response to the first tilting signal from the controller, the controller further controls the second lifting electric machine to drive the second reeling wheel to rotate for retracting the rear pull cord, whereby the bottom rail is tilted towards a same direction as a tilting direction of the slats to a substantially vertical position and partially overlaps an adjacent one of the slats, or/and when the tilting electric machine controls the tilting wheel to tilt the slats to the closed position in response to the second tilting signal from the controller, the controller further controls the first lifting electric machine to drive the first reeling wheel to rotate for retracting the front pull cord, whereby the bottom rail is tilted towards the same direction as the tilting direction of the slats to the substantially vertical position and partially overlaps an adjacent one of the slats.

12. The motorized venetian blind of claim 11, wherein the headrail has a datum surface, and the front pull cord, the rear pull cord, the front warp and the rear warp pass through the datum surface; when the controller controls the tilting electric machine to drive the tilting wheel to rotate in the first direction and controls the second lifting electric machine to drive the second reeling wheel to rotate for retracting the rear pull cord, an amount of upward movement with respect to the datum surface of the rear pull cord is greater than an amount of upward movement with respect to the datum surface of the rear warp; when the controller controls the tilting electric machine to drive the tilting wheel to rotate in the second direction and controls the first lifting electric machine to drive the first reeling wheel to rotate for retracting the front pull cord, an amount of upward movement with respect to the datum surface of the front pull cord is greater than an amount of upward movement with respect to the datum surface of the front warp.

13. The motorized venetian blind of claim 11, wherein the controller further controls the first lifting electric machine to drive the first reeling wheel to rotate for releasing the front pull cord in response to the second detector detecting tension smaller than the preset value while the first reeling wheel and the second reeling wheel are stationary; the controller further controls the second lifting electric machine to drive the second reeling wheel to rotate for releasing the rear pull cord in response to the first detector detecting tension smaller than the preset value while the first reeling wheel and the second reeling wheel are stationary.

14. The motorized venetian blind of claim 13, wherein the headrail has a datum surface, and the front pull cord, the rear pull cord, the front warp and the rear warp pass through the datum surface; when the controller controls the tilting electric machine to drive the tilting wheel to rotate in the first direction and controls the first lifting electric machine to drive the first reeling wheel to rotate for releasing the front pull cord, an amount of downward movement with respect to the datum surface of the front pull cord is greater than an amount of downward movement with respect to the datum surface of the front warp; when the controller controls the tilting electric machine to drive the tilting wheel to rotate in the second direction and controls the second lifting electric machine to drive the second reeling wheel to rotate for releasing the rear pull cord, an amount of downward movement with respect to the datum surface of the rear pull cord is greater than an amount of downward movement with respect to the datum surface of the rear warp.

15. The motorized venetian blind of claim 11, wherein the controller controls the first lifting electric machine to change a motion state of the first reeling wheel and controls the second lifting electric machine to change a motion state of the second reeling wheel in response to the first detector and the second detector both detecting tension smaller than the preset value for performing one of releasing the front pull cord and the rear pull cord concurrently, retracting the front pull cord and the rear pull cord concurrently, and stopping the front pull cord and the rear pull cord from moving.

* * * * *